United States Patent
Taylor et al.

(10) Patent No.: US 7,421,458 B1
(45) Date of Patent: Sep. 2, 2008

(54) QUERYING, VERSIONING, AND DYNAMIC DEPLOYMENT OF DATABASE OBJECTS

(75) Inventors: Jeff Taylor, Mountain View, CA (US); Rachel Wang, Foster City, CA (US); Li Zheng, Milpitas, CA (US)

(73) Assignee: Informatica Corporation, Redwood City, CA (US)

( * ) Notice: Subject to any disclaimer, the term of this patent is extended or adjusted under 35 U.S.C. 154(b) by 494 days.

(21) Appl. No.: 10/966,046

(22) Filed: Oct. 15, 2004

Related U.S. Application Data

(60) Provisional application No. 60/512,310, filed on Oct. 16, 2003.

(51) Int. Cl.
G06F 17/30 (2006.01)
(52) U.S. Cl. .......................... 707/203; 707/3; 717/170
(58) Field of Classification Search .................. 707/3, 707/101, 104.1, 203; 717/170, 174, 177
See application file for complete search history.

(56) References Cited

U.S. PATENT DOCUMENTS

| | | | |
|---|---|---|---|
| 5,317,729 A * | 5/1994 | Mukherjee et al. ............. 707/3 |
| 5,403,147 A | 4/1995 | Tanaka |
| 5,404,513 A | 4/1995 | Powers et al. |
| 5,405,531 A | 4/1995 | Hitzman et al. |
| 5,410,688 A | 4/1995 | Williams et al. |
| 5,420,688 A | 5/1995 | Farah |
| 5,455,945 A | 10/1995 | Vanderdrift |
| 5,499,365 A * | 3/1996 | Anderson et al. ........... 707/203 |
| 5,511,190 A | 4/1996 | Sharma et al. |
| 5,519,859 A | 5/1996 | Grace |
| 5,537,589 A | 7/1996 | Dalal |
| 5,563,999 A | 10/1996 | Yaksich et al. |
| 5,603,024 A | 2/1997 | Goldring |
| 5,655,101 A | 8/1997 | O'Farrell et al. |
| 5,675,785 A | 10/1997 | Hall et al. |
| 5,675,802 A * | 10/1997 | Allen et al. .................. 717/103 |
| 5,689,566 A | 11/1997 | Nguyen |
| 5,692,181 A | 11/1997 | Anand et al. |
| 5,706,495 A | 1/1998 | Chadha et al. |
| 5,708,828 A | 1/1998 | Coleman |
| 5,713,020 A | 1/1998 | Reiter et al. |
| 5,721,903 A | 2/1998 | Anand et al. |
| 5,721,911 A | 2/1998 | Ha et al. |

(Continued)

FOREIGN PATENT DOCUMENTS

EP 0987868 A3 3/2000

(Continued)

OTHER PUBLICATIONS

Beech et al. "Generalized Version Control in an Object-Oriented Database." IEEE. 1988.*

(Continued)

*Primary Examiner*—Leslie Wong
(74) *Attorney, Agent, or Firm*—Fenwick & West LLP

(57) ABSTRACT

In various embodiments, the present invention provides methods and systems for creating version-stamps of database objects and for tracking, querying, retrieving, and deploying such versioned database objects in enterprise databases, data marts, or data warehouses. The database objects may be inter-related and may reference one another according to their accurate versions.

5 Claims, 15 Drawing Sheets

U.S. PATENT DOCUMENTS

| | | | |
|---|---|---|---|
| 5,778,355 A | 7/1998 | Boyer et al. | |
| 5,781,911 A | 7/1998 | Young et al. | |
| 5,787,415 A | 7/1998 | Jacobson et al. | |
| 5,794,030 A | 8/1998 | Morsi et al. | |
| 5,794,228 A | 8/1998 | French et al. | |
| 5,794,229 A | 8/1998 | French et al. | |
| 5,794,246 A | 8/1998 | Sankaran et al. | |
| 5,799,310 A | 8/1998 | Anderson et al. | |
| 5,806,060 A | 9/1998 | Borgida et al. | |
| 5,819,092 A * | 10/1998 | Ferguson et al. | 717/113 |
| 5,822,751 A | 10/1998 | Gray et al. | |
| 5,826,258 A | 10/1998 | Gupta | |
| 5,832,496 A | 11/1998 | Anand et al. | |
| 5,842,213 A | 11/1998 | Odom et al. | |
| 5,848,415 A | 12/1998 | Guck | |
| 5,854,890 A | 12/1998 | Ramachandran et al. | |
| 5,857,197 A | 1/1999 | Mullins | |
| 5,870,746 A | 2/1999 | Knutson et al. | |
| 5,870,747 A | 2/1999 | Sandaresam | |
| 5,873,102 A | 2/1999 | Bridge, Jr. et al. | |
| 5,884,262 A | 3/1999 | Wise et al. | |
| 5,897,642 A * | 4/1999 | Capossela et al. | 707/203 |
| 5,898,431 A | 4/1999 | Bayles et al. | |
| 5,915,019 A | 6/1999 | Ginter et al. | |
| 5,933,796 A | 8/1999 | Ashida et al. | |
| 5,982,890 A | 11/1999 | Akatsu | |
| 5,987,454 A | 11/1999 | Hobbs | |
| 5,991,742 A | 11/1999 | Tran | |
| 6,002,402 A | 12/1999 | Schacher | |
| 6,003,024 A | 12/1999 | Bair et al. | |
| 6,014,670 A | 1/2000 | Zamanian et al. | |
| 6,026,388 A | 2/2000 | Liddy et al. | |
| 6,032,145 A | 2/2000 | Beall et al. | |
| 6,032,158 A | 2/2000 | Mukhopadhyay et al. | |
| 6,044,374 A | 3/2000 | Nesamoney et al. | |
| 6,065,007 A | 5/2000 | Muthukrishnan et al. | |
| 6,072,492 A | 6/2000 | Schagen et al. | |
| 6,078,994 A | 6/2000 | Carey | |
| 6,112,024 A * | 8/2000 | Almond et al. | 717/122 |
| 6,119,167 A | 9/2000 | Boyle et al. | |
| 6,122,628 A | 9/2000 | Castelli et al. | |
| 6,128,624 A | 10/2000 | Papierniak et al. | |
| 6,141,699 A | 10/2000 | Luzzi et al. | |
| 6,151,584 A | 11/2000 | Papierniak et al. | |
| 6,151,601 A | 11/2000 | Papierniak et al. | |
| 6,173,310 B1 | 1/2001 | Yost et al. | |
| 6,192,364 B1 | 2/2001 | Baclawski | |
| 6,205,472 B1 | 3/2001 | Gilmour | |
| 6,208,990 B1 | 3/2001 | Suresh et al. | |
| 6,216,125 B1 | 4/2001 | Johnson | |
| 6,233,575 B1 | 5/2001 | Agrawal et al. | |
| 6,268,663 B1 | 7/2001 | Itabashi et al. | |
| 6,269,336 B1 | 7/2001 | Ladd et al. | |
| 6,269,369 B1 | 7/2001 | Robertson | |
| 6,272,485 B1 | 8/2001 | Sragner | |
| 6,272,598 B1 | 8/2001 | Arlitt et al. | |
| 6,292,657 B1 | 9/2001 | Laursen et al. | |
| 6,308,203 B1 | 10/2001 | Itabashi et al. | |
| 6,336,137 B1 | 1/2002 | Lee et al. | |
| 6,339,775 B1 | 1/2002 | Zamanian et al. | |
| 6,369,840 B1 | 4/2002 | Barnett et al. | |
| 6,385,604 B1 | 5/2002 | Bakalash et al. | |
| 6,393,386 B1 | 5/2002 | Zager et al. | |
| 6,404,884 B1 | 6/2002 | Marwell et al. | |
| 6,408,292 B1 | 6/2002 | Bakalash et al. | |
| 6,411,936 B1 | 6/2002 | Sanders | |
| 6,418,200 B1 | 7/2002 | Ciccolella et al. | |
| 6,421,781 B1 | 7/2002 | Fox et al. | |
| 6,424,426 B1 | 7/2002 | Henry | |
| 6,430,624 B1 | 8/2002 | Jamtgaard et al. | |
| 6,438,552 B1 | 8/2002 | Tate | |
| 6,446,059 B1 | 9/2002 | Berger et al. | |
| 6,446,062 B1 | 9/2002 | Levine et al. | |
| 6,446,096 B1 | 9/2002 | Holland et al. | |
| 6,449,619 B1 | 9/2002 | Colliat et al. | |
| 6,457,030 B1 | 9/2002 | Adams et al. | |
| 6,466,969 B1 | 10/2002 | Bunney et al. | |
| 6,477,525 B1 | 11/2002 | Bello et al. | |
| 6,487,584 B1 | 11/2002 | Bunney | |
| 6,493,800 B1 | 12/2002 | Blumrich | |
| 6,502,101 B1 | 12/2002 | Verprauskus et al. | |
| 6,535,872 B1 | 3/2003 | Castelli et al. | |
| 6,539,359 B1 | 3/2003 | Ladd et al. | |
| 6,549,910 B1 | 4/2003 | Tate | |
| 6,549,937 B1 | 4/2003 | Auerbach et al. | |
| 6,553,366 B1 | 4/2003 | Miller et al. | |
| 6,563,912 B1 | 5/2003 | Dorfman et al. | |
| 6,564,264 B1 | 5/2003 | Creswell et al. | |
| 6,574,599 B1 | 6/2003 | Lim et al. | |
| 6,581,062 B1 | 6/2003 | Draper et al. | |
| 6,591,304 B1 | 7/2003 | Sitaraman et al. | |
| 6,601,062 B1 | 7/2003 | Deshpande et al. | |
| 6,616,701 B2 | 9/2003 | Doyle | |
| 6,629,102 B1 | 9/2003 | Malloy et al. | |
| 6,631,386 B1 * | 10/2003 | Arun et al. | 707/203 |
| 6,631,497 B1 | 10/2003 | Jamshidi et al. | |
| 6,636,870 B2 | 10/2003 | Roccaforte | |
| 6,671,689 B2 | 12/2003 | Papierniak | |
| 6,721,728 B2 | 4/2004 | McGreevy | |
| 2002/0035565 A1 | 3/2002 | Shah et al. | |
| 2002/0056081 A1 | 5/2002 | Morley et al. | |
| 2002/0059267 A1 | 5/2002 | Shah et al. | |
| 2002/0077787 A1 | 6/2002 | Rappaport et al. | |
| 2002/0099691 A1 | 7/2002 | Lore et al. | |
| 2002/0112237 A1 | 8/2002 | Kelts | |
| 2002/0161770 A1 | 10/2002 | Shapiro et al. | |
| 2002/0172247 A1 | 11/2002 | Bayer et al. | |
| 2003/0061245 A1 * | 3/2003 | Soria et al. | 707/203 |

FOREIGN PATENT DOCUMENTS

| | | |
|---|---|---|
| EP | 1043671 A2 | 10/2000 |
| EP | 1164511 A2 | 12/2001 |
| GB | 2350758 | 12/2000 |
| GB | 2357596 | 6/2001 |
| WO | WO 99/24922 | 5/1999 |
| WO | WO 00/04466 | 1/2000 |
| WO | WO 00/08581 | 2/2000 |
| WO | WO 00/77707 | 12/2000 |
| WO | WO 01/18728 | 3/2001 |
| WO | WO 01/20438 | 3/2001 |
| WO | WO 01/24040 | 5/2001 |
| WO | WO 02/44953 | 6/2002 |

OTHER PUBLICATIONS

24×7 The Magazine of Nonstop Computing, "Compaq's Zero Latency Enterprise Initiative," vol. 1, No. 2, Oct. 2000, pp. 1-25.

"A Process for Selective Routing of Servlet Transcoding Modules," IBM Technical Disclosure Bulletin, vol. 42, Issue 422, Jun. 1999 UK.

Multi-Modal Data Access Research Disclosure, Kenneth Mason Publications, Hampshire, GB, No. 426, Oct. 1999, pp. 133-1386.

"Parameterized XSL Style Sheets," Research Disclosure, vol. 42, No. 423, Jul. 1, 1999, Havant, UK, Article No. 423110.

Anand, V. J. et al. "Data Warehouse Architecture for DDS Applications." Australian Journal of Information Systems. Sep. 1996, AJIS Publishing, Australia, vol. 4, No. 1, pp. 43-53.

Ballinger, C. et al., "Born to be Parallel. Why Parallel Origins Give Teradata an Enduring Performance Edge," Bulletin of the Technical Committee on Data Engineering, vol. 20, No. 2, Jun. 1996, IEEE Comput. Soc., Los Alamitos, CA, US.

Barrett R. et al., "Intermediaries: An Approach to Manipulating Information Streams," IBM Systems Journal, IBM Corp., Armonk, New York, U.S. vol. 38, No. 4, 1999, pp. 629-641.

Bellatreche, L. et al., "OLAP Query Processing for Partitioned Data Warehouses," Proceedings 1999 Int'l. Symposium on Database Applications in Non-Traditional Environments (Dante'99) (CAT. No. PR00496), Kyoto, JP, Nov. 28-30, 1999, pp. 35-42, IEEE Comput. Soc., Los Alamitos, CA US ISBN: 0-7695-0496-5.

Bello, R.G. et al., "Materialized Views in Oracle," Proceedings of the Int'l. Conf. On Very Large Data Bases, NY, Aug. 24, 1998, pp. 659-664.

Chamberlin et al., "A Complete Guide to DB2 Universal Database," 1992, pp. 659-600.

Chan, R. "12 Steps of Creating a Successful Data Warehouse," Proceedings of the 8th International Database Workshop (Industrial Volume), Proceedings of the 8th International Hong Kong Computer Society Database Workshop, Data Mining, Data Warehousing and CLI, pp. 227-248, ISBN 981-3083-53-0, 1997, Singapore, Springer-Verlag Singapore, Singapore.

Chaudhuri, S. et al., An Overview of Data Warehousing and OLAP Technology, SIGMOD Record, Sigmod, New York, No. US, vol. 2, No. 1, Mar. 1997, pp. 65-74.

Curley, K. et al. "The Rationale for Developing a Corporate Data Warehouse and the Development of a Model for Sharing Data in a Data Warehouse Environment." OOIS '95. 1995 International Confernece on Object Oriented Information Systems Proceedings, Proceedings of 1995, International Conference on Object Oriented Information Systems, Dublin, Ireland, Dec. 18-20, 1995, pp. 351-366, Berlin Germany, Springer-Verlag, Germany.

Datta, A., et al., "A Case for Parallelism in Data Warehousing and OLAP," Ninth Int'l. Workshop on Database and Expert Systems Applications, Vienna, AT, IEEE Comput. Soc., Los Alamitos, CA US, Aug. 26, 1998, pp. 226-231,.

Dawson et al., RFC 2426 vCard MIME Directory Profile, Network Working Group, Request for Comments 2426, Sep. 1998.

Deutsch et al., "Storing Semistructured Data with Stored," ACM SIGMOD Record, Proceedings of the 1999 ACM SIGMOD International Conference on Management of Data, Jun. 1999, vol. 28, Issue 2.

Duncan, K., et al., "Optimizing the Data Warehousing Environment for Change: the Persistent Staging Area," Cutter IT Journal, Jun. 1999, Cutter Inf. Corp. USA, vol. 12, No. 6, pp. 28-35.

Fernandez et al., "SilkRoute: Trading Between Relations and XML," WWW9/Computer Networks, 33(1-6), pp. 723-745, 2000.

Florescu et al., "A Performance Evaluation of Alternative Mapping Schemes for Storing SML in a Relational Database," Technic Report 3680, INRIA, 1999.

Freytag, C. et al., "Resource Adaptive WWW access for Mobile Applications," Computers and Graphics, Pergamon Press Ltd., Oxford, GB, vol. 23, No. 6, Dec. 1999, pp. 841-848.

Fry, J.P, "Conversion Technology, An Assessment," ACM SIGMIS Database, vol. 12-13, No. 4-1, Jul. 1981, pp. 39-61.

Hammer, J. et al., "Extracting Semistructured Information From the Web," Proceedings of the Workshop on Management of Semi-structured Data, Mar. 16, 1997, pp. 1-25.

Hori M. et al., "Annotation-Based Web Content Transcoding," Computer Networks, Elsevier Science Publishers B.V., Amsterdam NL., vol. 33, No. 106, Jun. 2000, pp. 197-211.

Housel et al., "A High-Level Data Manipulation Language for Hierarchical Data Structures," International Conference on Management of Data, 1976, pp. 155-169.

Informatica Press Releases, "Informatica Delivers Industry' First Synchronized Data Marts With Newest Version of Powermart Suite," http://www.informatica.com/syndata—052798.html, pp. 1-4, May 27, 1997.

Informatica Press Releases, "Informatica Unveils Architecture for Networking Multiple Data Marts Into an Enterprise-Wide Data Warehouse," http://www.informatica.com/edm—082697.html, pp. 1-4, Aug. 26, 1997.

Jaczynski, M. and Trousse, B., "Broadway: A Case-Based System for Cooperative Information Browsing on the World Wide Web," Collaboration Between Human and Artifical Societies, Online 1999.

Jones, Katherine, "An Introduction to Data Warehousing: What are the Implications for the Network," 1998, International Journal of Network Management, vol. 8, pp. 42-56.

Juhne, J., et al., "Ariadne: a Java-Based Guided Tour System for The World Wide Web," Computer Networks and ISDN Systems, North Holland Publishing, Amsterdam, NL, vol. 30, No. 107, Apr. 1, 1998, pp. 131-139.

Kim, W., "On Optimizing an SQL-Like Nested Query," ACM Transactions on Database Systems, Association for Computing Machinery, New York, US, vol. 7, No. 3, Sep. 1, 1982, pp. 443-469.

Kitayama, F. et al., "Design of a Framework for Dynamic Content Adaptation to Web-enabled Terminals and Enterprise Applications," Software Engineering Conference, 1999. Proceedings Sixth Asian Pacific Takamatsu, Japan, Dec. 7-10, 1999, Los Alamitos, CA, US.

Lum, V. Y. et al., "A General Methodology for Data Conversion and Restructuring," IBM Journal of Research and Development, IBM Corporation, Armonk, US, vol. 20, No. 5, Sep. 1, 1976, pp. 483-497.

Mohania M. et al.: "Advances and Research Directions in Data Warehousing Technology," Ajis. Australian Journal of Information Systems, Wollongong, Au. vol. 7, No. 1, Sep. 1999, pp. 41-59.

Mumick I. S. et al. "Maintenance of Data Cubes and Summary Tables in a Warehouse." SIGMOD 1997. ACM SIGMOD International Conference on Management of Data, Tucson, AZ, USA, May 13-15, 1997, vol. 26, No. 2, pp. 100-111, XP002074807, Jun. 1997, ACM, USA.

Mumick, I., "Magic is Relevant," Sigmod Record, Sigmod, New York, NY, US, vol. 19, No. 2, Jun. 1, 1990, pp. 247-258.

Rodriguez J. et al., "IBM WebSphere Transcoding Publisher V1:1: Extending Web Applications to the Pervasive World," (http://ibm.com/redbooks), Jul. 2000, pp. 1039.

Rousskov, "Cache Digests," Computer Networks and ISDN Systems, 30 (1998) 2144-2168.

Roy et al., "Don't Trash Your Intermediate Results, Cach'em," Technical Report, Online, Mar. 2, 2000, pp. 1-22.

Schneiderman et al., "An Architecture for Automatic Relational Database System Conversion," ACM Transactions on Database Systems, vol. 7, No. 2, 1982.

Schneier, B., "Applied Cryptography, Second Edition," 1996, pp. 189-196, 226-227.

Shanmugasundaram et al., "Relational Databases for Querying SML Documents Limitations and Opportunities," Proc. Of VLBD, pp. 302-314, 1999.

Seshadri, P. et al., "SQLServer for Windows CE-A Database Engine For Mobile And Embedded Platforms," Data Engineering 2000. Proceedings 16th International Conference in San Diego, CA, US, Feb. 29, 2000, IEE Computer Soc., US, Feb. 29, 2000, pp. 642-644.

Shimura et al., "Storage and Retrieval of XML Documents Using Object-Relational Databases," Proc. Of DEXA, pp. 206-217, 1999.

Shu et al., "Convert: A High Level Translation Definition Language for Data Conversion," Communications of the ACM, vol. 18, No. 10, Oct. 1975, pp. 557-567.

Shu et al., "Convert:* A High Level Translation Definition Language for Data Conversion;" Proceedings of the 1975 ACM SIGMOD International Conference on Management of Data, May 1975, p. 111.

Shu et al., "Express: A Data Extraction, Processing, and REStructuring System," ACM Transactions on Database Systems, vol. 2, No. 2, Jun. 1977, pp. 134-174.

Shu, Nan, "Automatic Data Transformation and Restructuring," IEEE, 1987, pp. 173-180.

Squire, C., "Data Extraction and Transformation for the Data Warehouse," ACM Proceedings of SIGMOD. International Conf. On Management of Data, vol. 24, No. 1, Mar. 1, 1995, p. 446.

Weyman, P.J., "The Case for a Process-Driven Approach to Data Warehousing," Database and Network Journal, A.P. Publications, London, FB, vol. 27, No. 1, Feb. 1, 1997, pp. 3-6.

White, C., "Data Warehousing: Cleaning and Transforming Data," INFO DB, vol. 10, No. 6, Apr. 1997, pp. 11-12.

White, C., "Managing Data Transformations," byte, McGraw-Hill Inc., St. Peterborough US, vol. 22, No. 12, Dec. 1, 1997, pp. 53-54.

* cited by examiner

| File | Edit | View | Tools | Help |
|------|------|------|-------|------|

| Object Name | Group Name | Object Type | Version | Time Stamp | Status | Version Comments | Folder Name |
|---|---|---|---|---|---|---|---|
| MAPPING1 | | Mapping | 5 | 10/14/2003 00:00:14 | Active | next version | SHARED1 |
| MAPPING1 | | Mapping | 4 | 10/13/2003 23:46:23 | Active | 4th vers | SHARED1 |
| MAPPING1 | | Mapping | 3 | 10/13/2003 23:37:02 | Active | third version | SHARED1 |
| MAPPING1 | | Mapping | 2 | 10/13/2003 23:36:30 | Active | second version | SHARED1 |
| MAPPING1 | | Mapping | 1 | 10/13/2003 23:35:51 | Active | Checked In. | SHARED1 |

901

Labels

| Label Name | User Name | Time Stamp |
|---|---|---|

No items to be displayed in this view.

Version Comment: next version

Ready — Total: 5 — Selected: 1

QUERYING, VERSIONING, AND DYNAMIC DEPLOYMENT OF DATABASE OBJECTS

CROSS-REFERENCE TO RELATED APPLICATION

This application claims the benefit of U.S. provisional patent application Ser. No. 60/512,310, filed Oct. 16, 2003, entitled "Querying, Versioning, and Dynamic Deployment of Database Objects," which is hereby incorporated by reference.

FIELD OF THE INVENTION

This invention relates to database management and data processing. Specifically, this invention provides methods for tracking, querying, and dynamically deploying database objects based on a database object versioning system.

The methods and systems of this invention may be advantageously applied in conjunction with various database management systems (DBMS) such as relational DBMS or object DBMS. They can facilitate data retrieval, data update, and database application development. Particularly in an enterprise setting, the methods and systems disclosed herein are useful for Extract, Transformation, and Load (ETL), data warehousing, enterprise application integration (EAI), and enterprise information integration (EII).

BACKGROUND

Effective integration and utilization of information is key to today's research institutions and business enterprises. A variety of tools have been made available publicly or commercially for building, deploying, and managing enterprise data warehouses and other data integration projects. Such tools enable the transformation of data from disparate enterprise systems and sources into useful information to support research undertakings and business initiatives. See, e.g., Informatica® PowerCenter® and Informatica® PowerCenterRT™ (http://www.informatica.com/products/power-center/default.htm). The real time data integration software such as Informatica® PowerCenterRT™ may be particularly useful in combining transactional data generated by, e.g., online systems and EAI applications, with historical information stored in enterprise databases or warehouses.

However, to manage and track dynamic changes of data, coordinate and control deployment of data objects to one or more enterprise databases, data marts, or warehouses, and support consistent user access to updated versions of data objects, there remains a need for a methodology for effective identification and management of changes of database objects in an enterprise information environment.

SUMMARY OF THE INVENTION

In various embodiments, the present invention provides methods and systems for creating versions of database objects and for tracking, querying, retrieving, and deploying such versioned database objects in enterprise databases, data marts, or data warehouses. The database objects may be inter-related and may reference one another according to their accurate versions.

In a further embodiment, the present invention provides methods for versioning both complex objects and other objects referenced by complex objects. When a complex object that references a non-reusable object is checked out for modification, the non-reusable object is not automatically checked out. After the complex object is modified and checked in, the complex object's version number increments, but the version number of the unmodified non-reusable object remains the same. In contrast, when a user attempts to modify the referenced non-reusable object along with the complex object, the non-reusable object is then checked out. After the complex object and the non-reusable object are modified and checked in, the version numbers of each are incremented, and the reference of the complex object to the non-reusable object is updated to be the incremented version number of the non-reusable object. Thus, a benefit of these methods is that storage space is saved by not creating unnecessary new versions of objects that have not been modified.

In some embodiments, cached copies of objects are used in other applications, but these copies may become outdated by new versions. When a new version of one of these objects is checked in, notification of the incremented version number of the object is sent to the other applications. A benefit of this method is improved synchronization across applications.

In a further embodiment, users can query for versioned objects based on one or more criteria. By default, the query results return only the latest version of the objects satisfying the criteria. When a query contains an object state criterion, then the query results include all versions of all objects that satisfy the criteria. This improves the user's ability to tailor the result set to include only versions of interest to the user.

In another embodiment, the present invention provides methods for fetching a version of an object that is referenced by another object. If the referenced object is reusable, the version of the referenced object that is fetched is the version corresponding to the version number of the referenced object that is included in the referring object. If the referenced object is non-reusable, then the version of the referenced object that is fetched depends on whether version of the referring object is the latest version. If the version of the referring object is the latest version, then the latest version of the referenced object is fetched. If the version of the referring object is not the latest version, then the version of the referring object that has the most recent check in time that is prior to the referring object's check out time is fetched. These methods are useful to ensure that the appropriate version of the referenced object is fetched for a given version of the referring object as new versions of both the referring and referenced object are created.

In a further embodiment, the present invention provides a method for dynamically deploying a set of objects. A plurality of objects is stored in a dynamic deployment group in a source repository. At least one of the objects in the dynamic deployment group is a query object that stores a query for selecting objects for inclusion in the deployment group. When a request is made to deploy the deployment group, the query is executed and a set of objects satisfying the query is returned. For each selected object, the version of the object to deploy is determined and associated with the deployment group. Then, the objects of the deployment group are deployed in the target repository. Thus, in a database with versioned objects, the versions of objects to be deployed can be dynamically determined by executing a query when deployment is requested, eliminating a need to add objects to the deployment group incrementally prior to requesting the deployment of the group.

In some embodiments, to determine which version of an object to deploy, the query stored in the query object includes a condition for the object that indicates that it is ready to deploy. In these cases, the version of each object that is selected is the one indicated as being ready to deploy. Otherwise, the current version of the object is selected. This ability to pre-mark versions of objects as ready for deployment simplifies the process for requesting and executing a deployment.

BRIEF DESCRIPTION OF THE DRAWINGS

FIG. 8 is an illustration of the view of the History of the Source Definition after three versions of the Source Definition have been created and checked in.

FIG. 9 is an illustration of the view of the History of the Mapping after five versions of the Mapping have been created and checked in.

FIG. 10 is an illustration of a query editor.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

I. Versioning

According to one embodiment, the present invention provides a database versioning system that allows check out and check in of objects as well as viewing the history of all changes to an object in the repository. Examples of data or database objects in a database repository include Definition, Target Definition, Transformation, Mapping, Session, and Workflow. Such a database repository may support ETL, EAI, or EII operations in various embodiments.

Check Out and Check in

Figure 14:
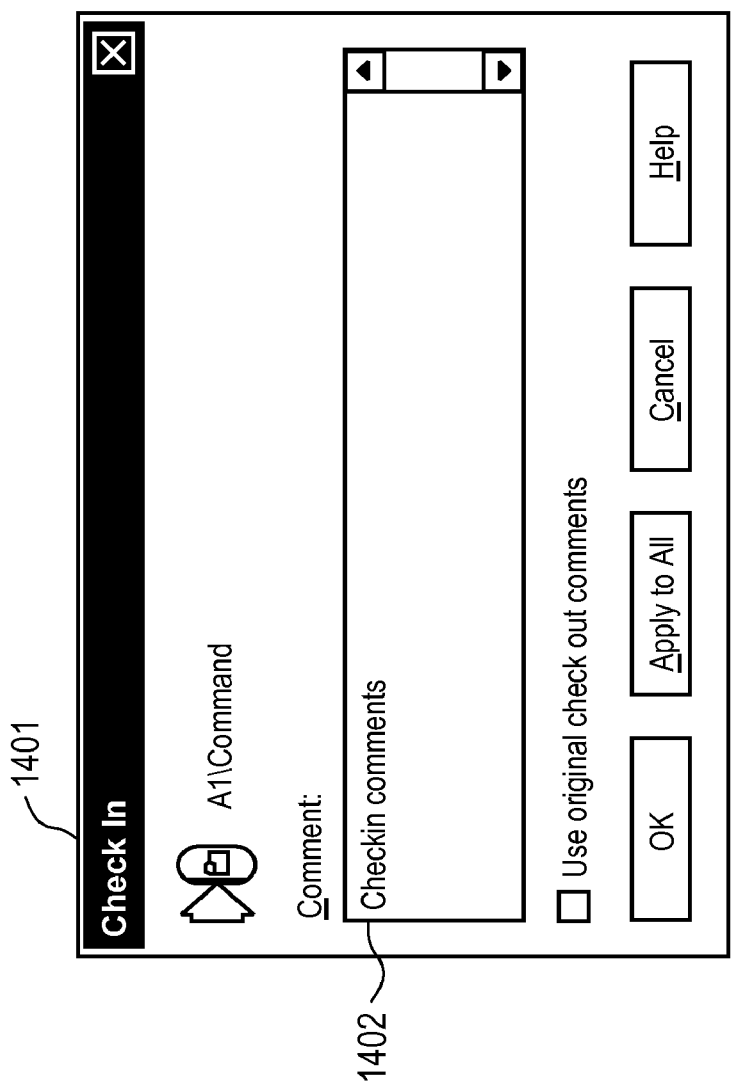
FIG. 14 is an illustration of a check in dialog box.

Users are required to check out an object before they can modify a versioned object. Before an object can be modified, a Write-Intent lock must be obtained. If the lock cannot be obtained, the user is not allowed to modify the object. Once an object has been changed, the object must be checked in to make the changes visible to all users in the repository. Thus, to publish the changes they have just made, users will be required to check in their changes. FIG. 14 shows a dialog box (1401) that is displayed to users upon check in. This dialog box (1401) prompts users to enter check in comments in the comment box (1402) provided. These comments and the identity of the user that made the changes will be recorded in the repository with the new version of the object. The comments are visible along with the object version's properties.

View History

Figure 3:
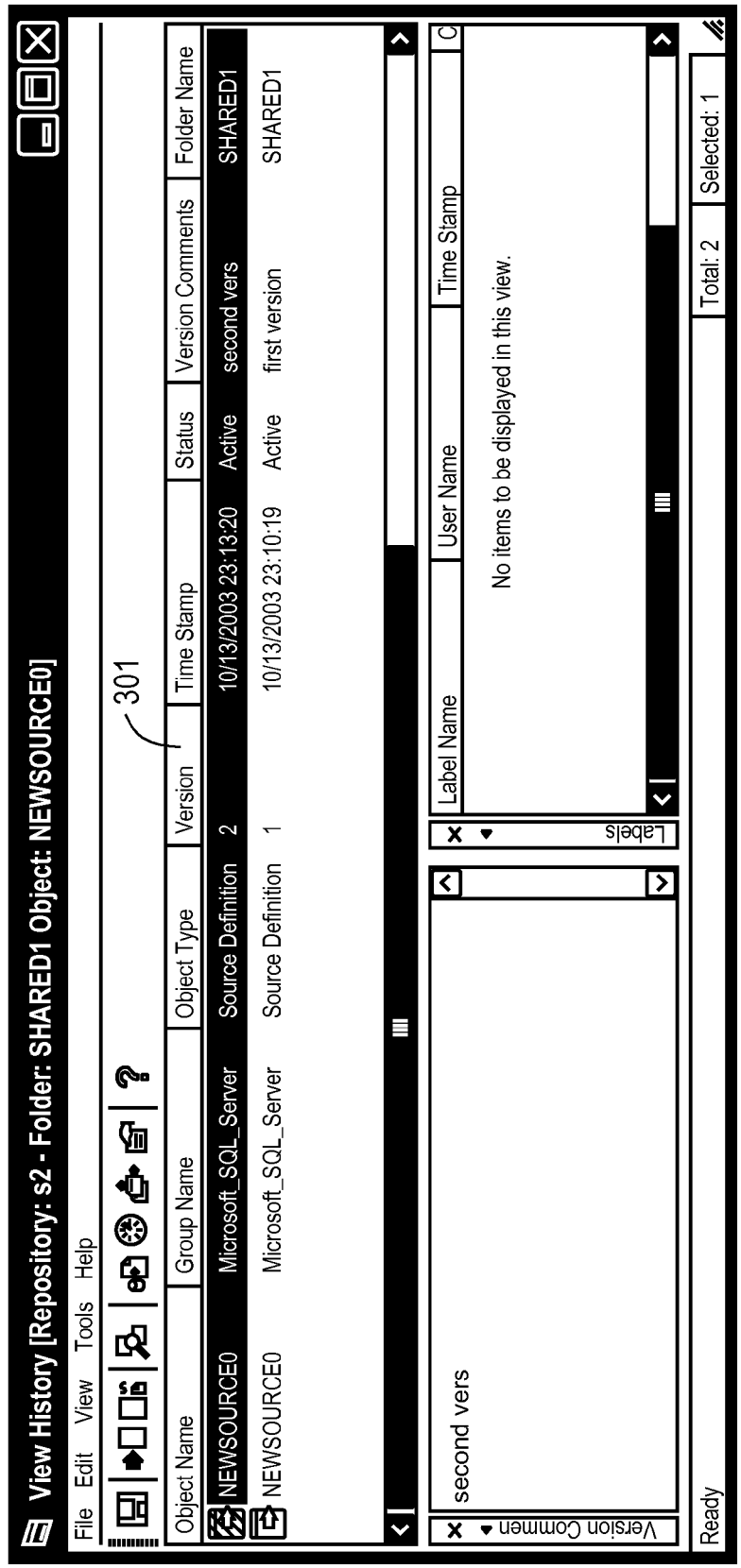
FIG. 3 is an illustration of the view of the History of the Source Definition after checking out, modifying, and checking in the Source Definition.

The object view history command is used to view the history of all changes to a specific object in the repository. See, e.g., FIG. 3. The information displayed in the view history window will include the following for each version of the object: object type; object name; folder name (if applicable); last saved time (same as the check in time); object version number; user that made the changes; computer name where the changes were made; check in comments; and all Labels that have been applied to the selected version of the object.

From the view history window, the user can select one or more versions of an object. The following commands are available: compare two versions of an object; export to XML file; apply Label; add to deployment group; and purge version.

Labels

Labels are objects that can be associated or applied to any other versioned object in the repository. They can be used to mark objects or associate a group of objects. The user can also view all objects that have a specified Label applied to them. The labeling functionality is split into two parts: Label objects and applying or associating Labels to other versioned objects.

The Label object has the following properties: label name; label type—one per version or one per object; comments; user that created the Label object; and creation date. Labels are global objects within a repository and can be used across folders. Users can access Labels, Deployment Groups and Queries via a global objects menu. Selecting the global objects Labels menu item will display the label browser to the user. Users can view, create, edit, and delete Label objects from this browser. These functions may require privilege verification that the user has the permission level needed to execute the function. Permissions may be set for each Label individually.

The view objects command will display a list of the properties of objects. This list contains all the object versions that currently have the selected Label. Internally, this will execute a predefined query to list all the objects that have this Label. The results are displayed in a query results window.

Deleting a Label object will permanently delete the Label object. This also permanently deletes all history of the Label object and any associations it has with other versioned objects. The versioned objects themselves are not deleted or modified in any way.

Depending on the user's permissions on a particular Label, the edit and delete buttons in the label browser will be enabled or disabled. Choosing the edit or add button on the browser will bring up the label editor. Creating a Label object will prompt the user for the Label object's name and comments. The Label's name must be unique in the repository. The following label types are available: one per version—user can label each version of the object with the same Label; one per object—user can have one Label per object only. A user can lock the Label so nobody can modify it.

Figure 15A:
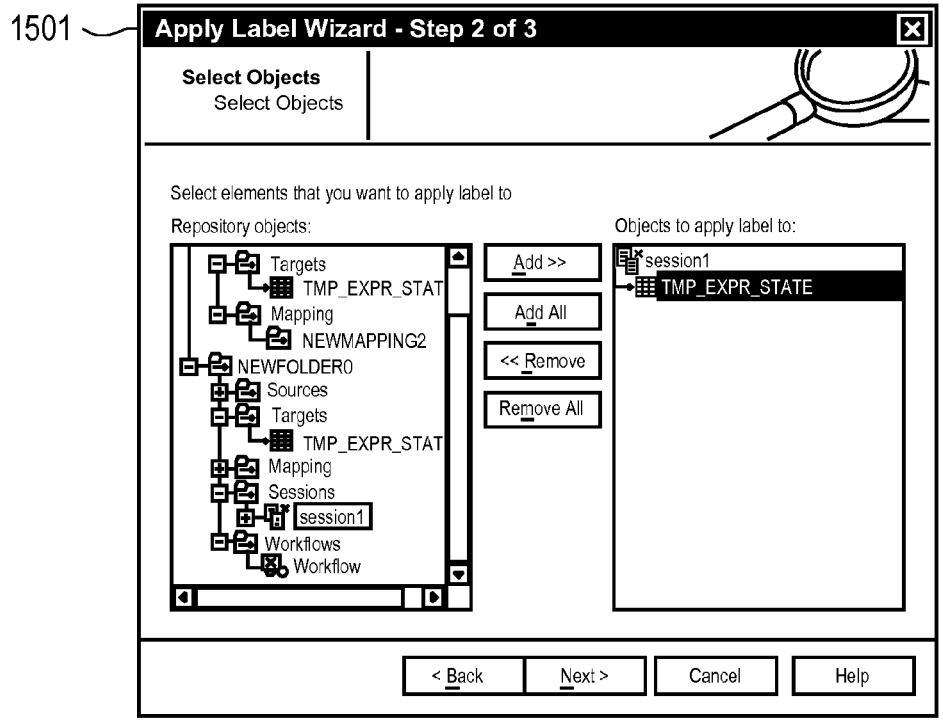
FIG. 15a is an illustration of a dialog box for an Apply Label Wizard.
Figure 15B:
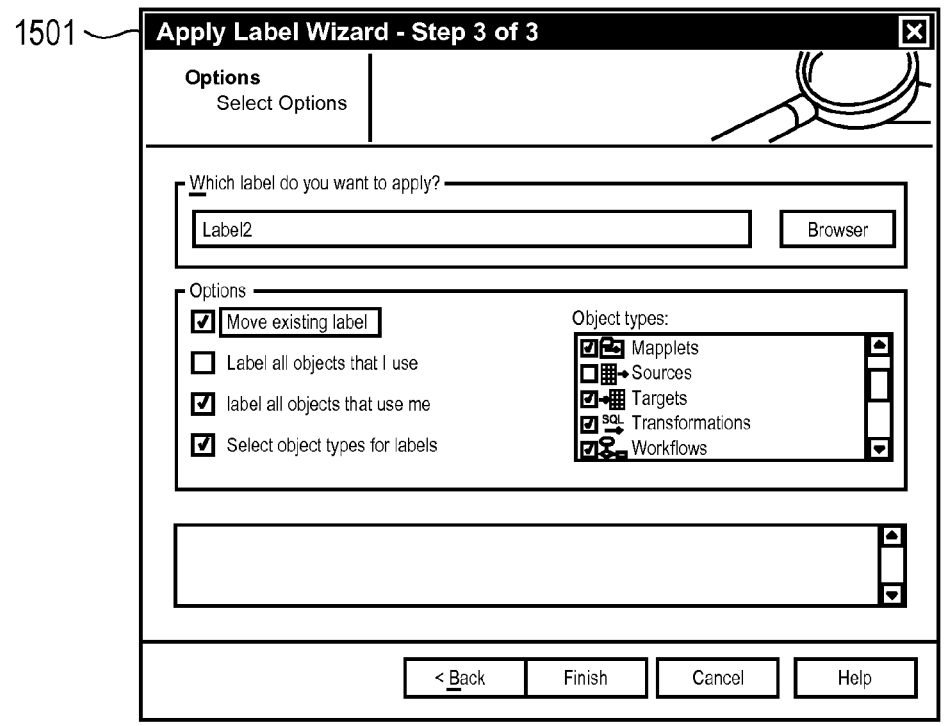
FIG. 15b is an illustration of a dialog box for an Apply Label Wizard.

Labels can be applied to all versioned objects in the repository. Applying Labels can be done in many places throughout the client tools such as the history browser of an object and the query results window. The "Apply Label" menu item brings up the label browser. Users can select a particular Label in the browser and select the apply button to apply the Label to the object. Referring now to FIGS. 15*a* and 15*b*, in some embodiments, an Apply Label Wizard (1501) helps users to select what objects will be labeled by which Label.

Multiple versions of the same object cannot contain the same Label if the Label is of the type one per object, such as the "Ready to Deploy" Label. That is, if version 5 of a Mapping has the Label "Ready to Deploy" and the user wants to apply the same Label to version 6 of the Mapping, the Label will have to be moved from version 5 to 6. If the user does not do this, the client tools should display an appropriate message.

A "Remove Label" menu item will be available wherever "Apply Label" is available to users. On invoking this menu item, once again the labels browser will be displayed to the user. However, now only those Labels that have been applied to this object/version will be enabled. The remaining Labels in the browser will be disabled for selection. Removing a Label like this will only remove the Label reference, the object/version and the Label object itself will not be deleted.

Applying a Label to an object will also allow a comment to be specified. The action of labeling an object is an event that is recorded in the repository in a Label log. The information saved includes the Label that was applied, the object(s) it was applied to, the user that applied the Label, timestamp information, and any comments entered by the user. This information is not deleted or altered when the same Label is applied to a different version of the object. From the label browser, users can select a particular Label and view the logs associated with this Label.

Version Numbers

Version numbers apply only to objects, and all versioned objects will have a version number. The version number is unique with an object. The version number has an initial value of 1 when the object is first created. Modifying an object (checking in an object) will always increment the version number automatically. The user cannot specify the version number's value at any time. For all practical purposes, this is a read only value.

Each object that is versioned has a status. The information stored for the status is defined below:

Deleted refers to an object that has been logically deleted, but not physically deleted in the repository. Objects marked as deleted can be recovered by querying to find objects with a status of deleted.

Latest refers to the most recent version of an object. Exactly one version of an object can and must be the latest.

Older refers to all non-latest versions of an object.

Locked refers to a state in which no user, including the Super User, is allowed to modify the object. All objects are normally in the "Active" state. To prevent anyone from modifying an object, the object's state can be changed to "Frozen." A frozen object cannot be checked out or changed.

New refers to an object that has been saved, but it has not been checked in yet.

Visible refers to the one version of an object to display to the user. At most one version of the object can be visible. Although any version can be made visible, the usual case is for the latest version to be visible. If an object is deleted, then no versions are visible because no versions of deleted objects should be displayed to the user.

Before an object can be modified, it must be checked out. Only one version of an object may be checked out at a time. To check in a new version of an object, the new version of the object is saved, the new version's status is updated to indicate it is visible, and the previously visible version of the object is updated to say that it is no longer visible. The time that an object was checked in is stored in each of the main object tables in UTC format.

Object References

Some types of objects can have references to other objects. For example, a Mapping has a reference to a Source Definition. That is, the Mapping is "using" the Source Definition. Objects that reference other objects are considered complex objects. Objects that do not reference other objects are considered simple objects.

Some types of objects are reusable. For example, one Source Definition can be reused in an unlimited number of Mappings because all Source Definitions are reusable. That is, the Mapping is "using" the Source Definition, but the Mapping does not "own" or have any exclusive rights to that Source Definition because the Source Definition is reusable.

Certain types of objects can also be non-reusable. That is, non-reusable objects are used by only one other object. For example, a non-reusable Transformation is used in only one Mapping. That is, the Mapping is "using" the Transformation, and the Mapping "owns" and has exclusive rights to that Transformation. A non-reusable object may be made into a reusable object, but in one embodiment, this is an irreversible operation. Once saved to the repository, this change is permanent and visible to all users.

A primary reference is a reference from one object to another that results in the referenced object being fetched. A secondary reference is a reference from one object to another that does not result in the referenced object being fetched. Instead, the referenced object should have already been fetched due to a primary reference. When a primary reference is encountered, the referenced object must be fetched. To fetch the object, the version of the object to fetch must be determined. The following rules exist, in this order of precedence:

1. If the referenced object can be a non-reusable object, then the referring object must store the version of the referenced object.
2. If the referring object is the latest version, then the latest version of the referenced object is fetched.
3. If the referring object is an older version, then ref_time is used to determine what version of the referenced object to fetch.

Ref_time depends on whether the object is the latest version or an older version. If the version of the object is the latest version, then ref_time indicates the time when the object was marked deleted. If the object is not deleted then ref_time is unused. If the version of the object is an older version, then ref_time indicates the time when the user checked out the object.

Non-reusable objects cannot be saved or checked in independently of their parent object. To save space in the repository and to avoid creating new versions of all non-reusable objects, the system only saves those non-reusable objects that were actually changed by the user. As a result, the non-reusable object's version number will not necessarily be the same as the complex object's version number. Thus, the system will store the non-reusable object's version number along with any primary reference to that non-reusable object.

Clients will generally fetch the latest version of the repository objects for all editing purposes. Only for special purposes like comparing an object with its older version will clients fetch the older versions of the object. When fetching the latest version of a complex object, the system fetches the latest version of any referenced object. When fetching a prior version of the complex object, the system must determine which version of the referenced objects to fetch. The ref_time of the complex object informs the system not to use any version of a referenced object newer than the ref_time. To determine this, the system compares the complex object's ref_time to the check in time of the versions of the referenced object. The version of the referenced object that will be fetched is the most recent version that has a check in time that is prior to the ref_time of the complex object.

Versioning of Simple Reusable Objects

Figure 1:
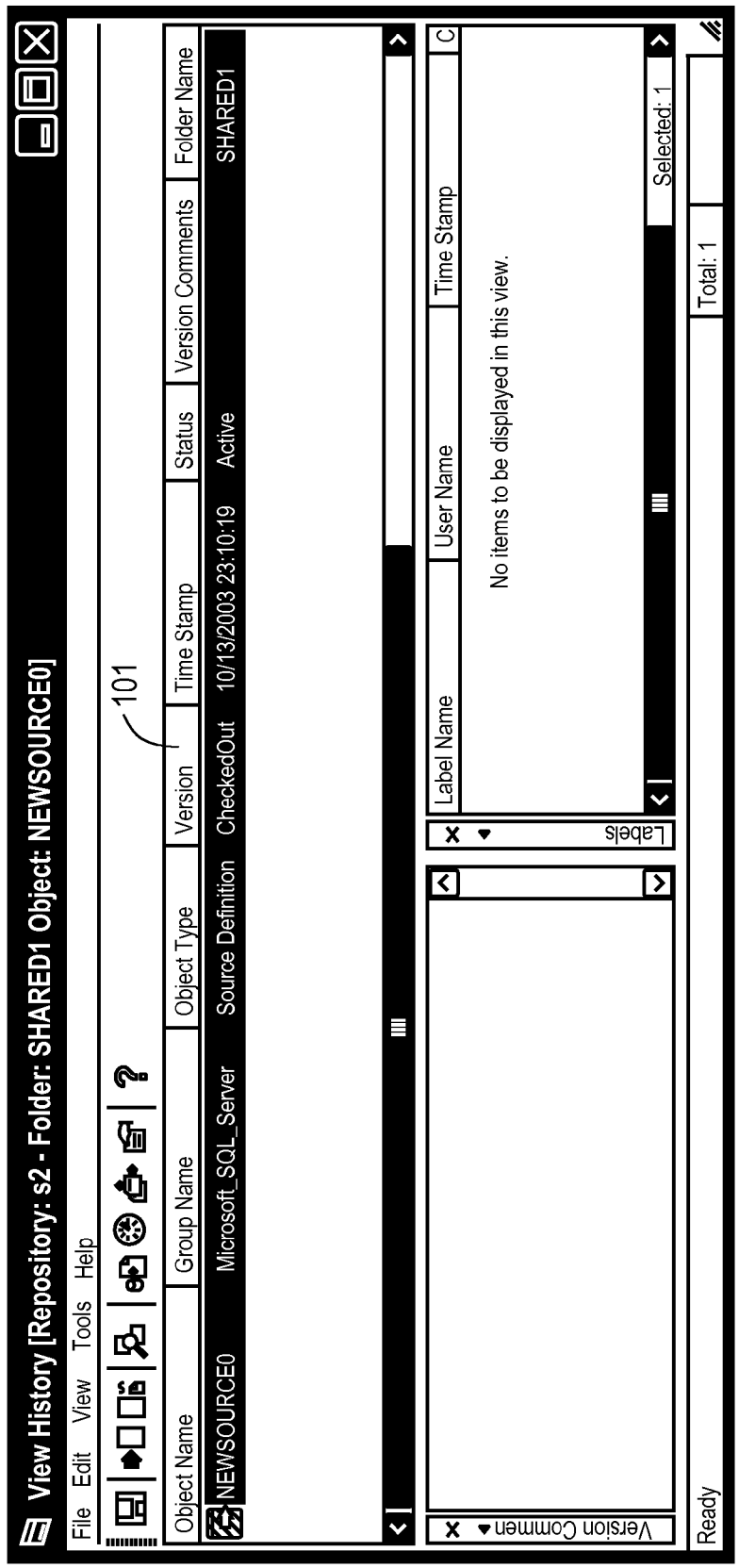
FIG. 1 is an illustration of a view of the History of the Source Definition after creating the Source Definition but before checking in the Source Definition.
Figure 2:
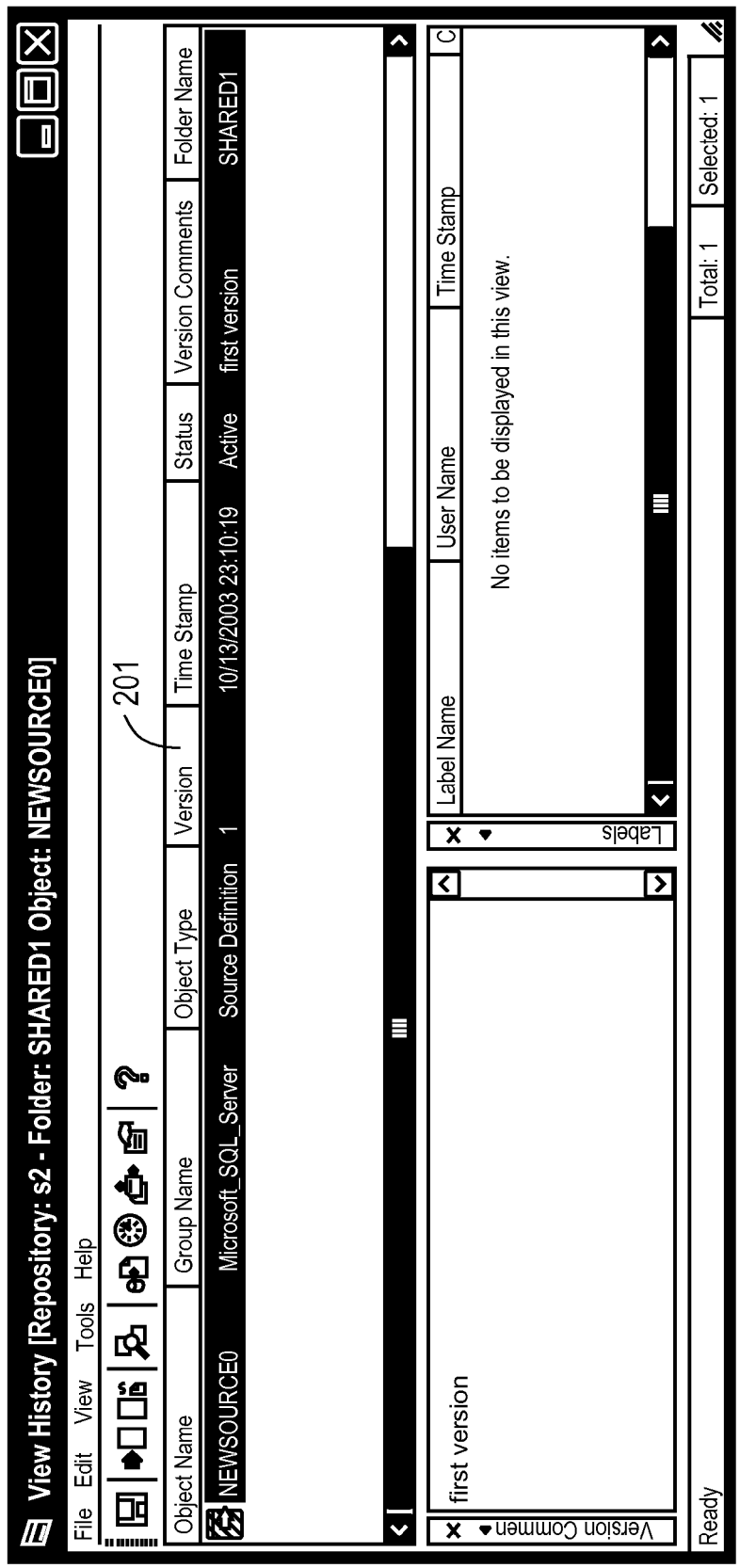
FIG. 2 is an illustration of the view of the History of the Source Definition after checking in the Source Definition.

Versioning may be applied to simple reusable objects in one embodiment. Each object may have multiple versions in the repository. For example, for a simple object such as a Source Definition, creating the Source Definition results in the database system assigning it a version number of 1. The view of the History of the Source Definition after creating the Source Definition is shown in FIG. 1. The version (101) is displayed as checked out. After checking in this Source Definition, View History shows its version (201) as 1. See FIG. 2. After checking out, modifying, and checking in the Source Definition again, View History shows two versions (301) of the Source Definition: 1 and 2. See FIG. 3.

Since a Source Definition is a simple object (it has no references to other objects), a complete copy of the object may be stored in the data repository for each version. In this example, two versions of the Source Definition have been created; therefore, two complete copies of this Source Definition are stored in the data repository. No "deltas" or differences between the versions are stored in the repository. Also recorded in the data repository is some additional versioning-related information for each version of the Source Definition, including, e.g., last saved time (the time when the Source Definition was most recently saved), check in time (the time when the Source Definition was checked in), and check out time (the time when version 1 was checked out to create version 2). Checking out version 1 will eventually result in the check in of version 2.

Versioning of Complex Objects

Versioning may be applied to complex data objects as well. For example, for a complex reusable object such as a Mapping, versioning and referencing to other objects operate in a different manner than for a simple object. Mappings can have references to many non-reusable objects, including, e.g., Transformations. Checking out and checking in a Mapping works the same way as it does for the Source Definition described supra. Checking out the Mapping does not check out any non-reusable objects in the Mapping. A non-reusable object in the Mapping will be automatically checked out if and when it is modified. Checking in a Mapping will also automatically check in all non-reusable objects used in that Mapping.

Figure 4:
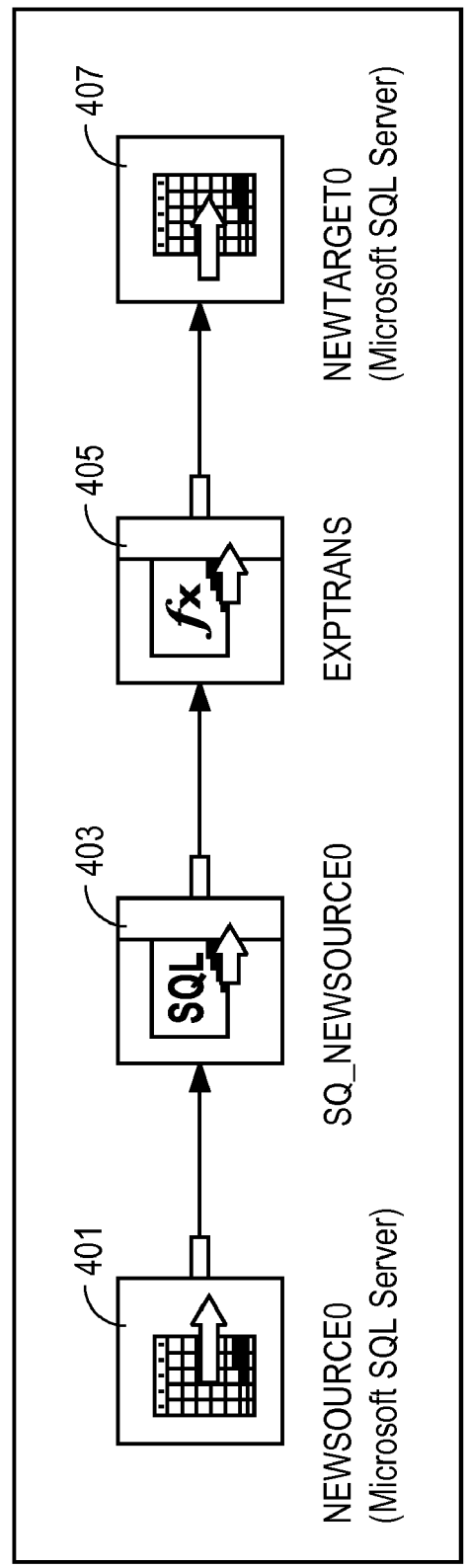
FIG. 4 is an illustration of a Mapping using both reusable and non-reusable objects.

For example, referring to FIG. 4, a Mapping is created with two non-reusable Transformations. The specific Transformations used in this example are a Data Source Qualifier and an Expression. The Mapping uses four objects and starts with a reusable Source Definition called NEWSOURCE0 (401), then the non-reusable Data Source Qualifier Transformation (403), then the non-reusable Expression Transformation called EXPTRANS (405), and finally a reusable Target Definition called NEWTARGET0 (407). The Source Definition (401) and Target Definition (407) are reusable, while the Data Source Qualifier (403) and Expression Transformations (405) are non-reusable and are owned by the Mapping. These two non-reusable objects cannot be checked out and checked in independently of the object that owns them, the Mapping.

Figure 5:
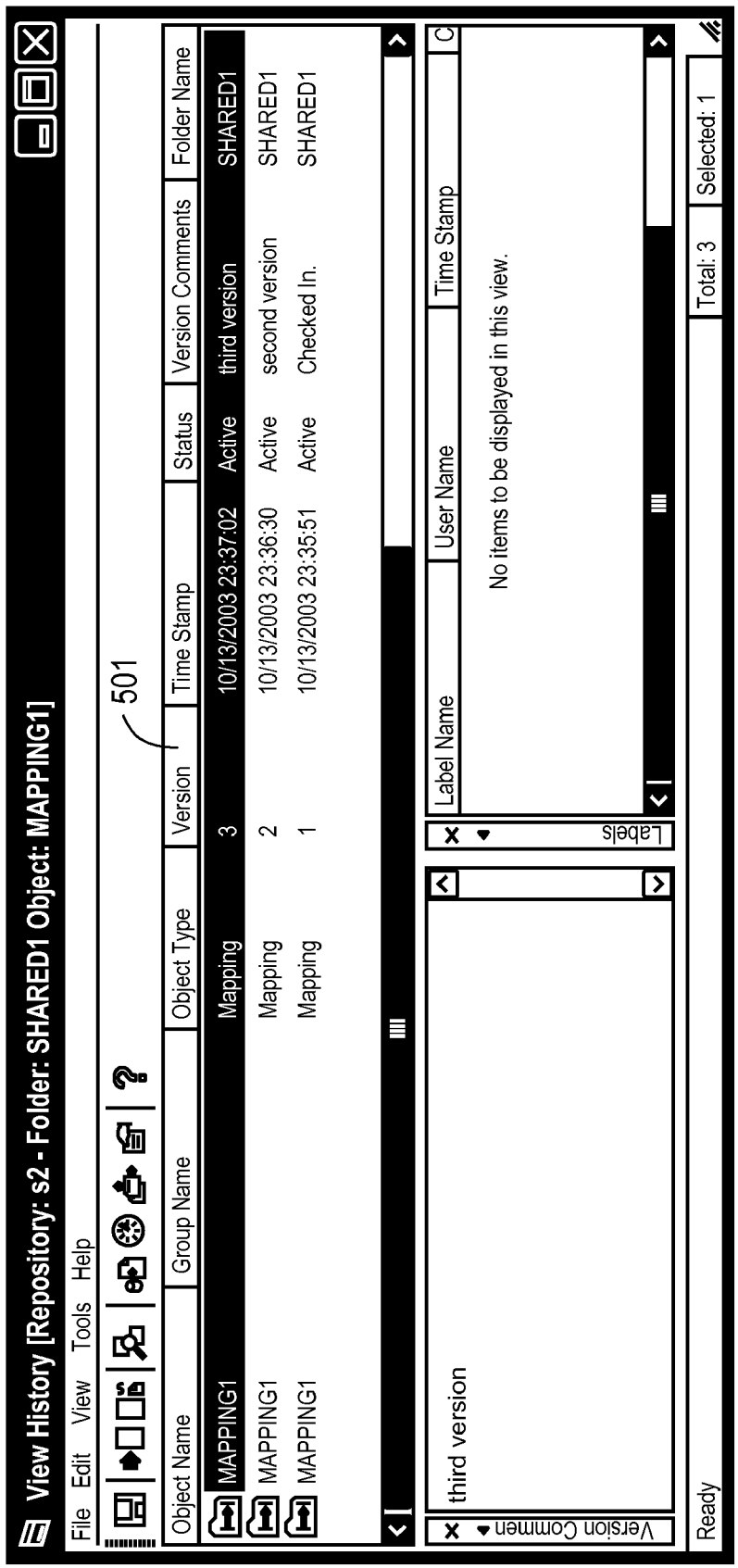
FIG. 5 is an illustration of the view of the History of the Mapping showing three versions of the Mapping.

After the Mapping is created, repeatedly modified, and checked in and out a few times, a view of the History of the Mapping shows three versions (501) of the Mapping (FIG. 5).

Figure 6:
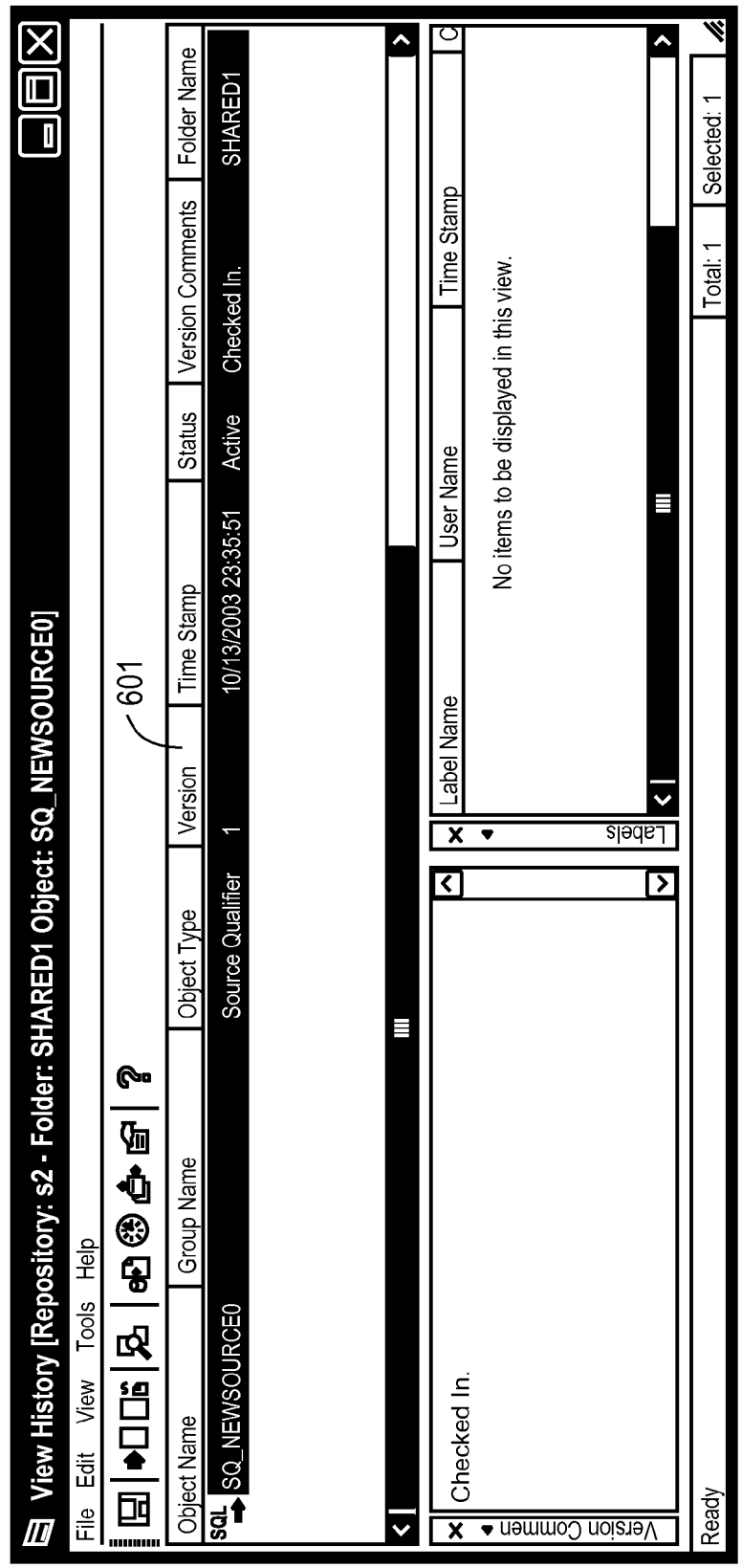
FIG. 6 is an illustration of the view of the History of a non-reusable Transformation after three versions of the Mapping that uses the non-reusable Transformation have been created.

When one selects the non-reusable Transformations in the Mapping and views the History of that Transformation, one may observe that there is only one version (601) of the non-reusable Transformation (FIG. 6). It is noted that, in this embodiment, the storage space required in the database repository for saving objects is minimized by reducing redundancy. Just as the reusable Source Definition saves a complete copy of the Source Definition for each version of the Source Definition, the reusable Mapping also saves a complete copy of the Mapping for each of the three versions of the Mapping. However, the non-reusable objects that the Mapping uses or "owns" do not have three complete copies of them. The three versions of the Mapping are all "sharing" the one copy of the non-reusable object. Therefore, the execution and management of versioning according to this embodiment is not based on the "deltas" or differences of various versions of an object, nor is it based on complete copies of the object, but rather, it is in between those two ways of tracking and recording changes.

Figure 7:
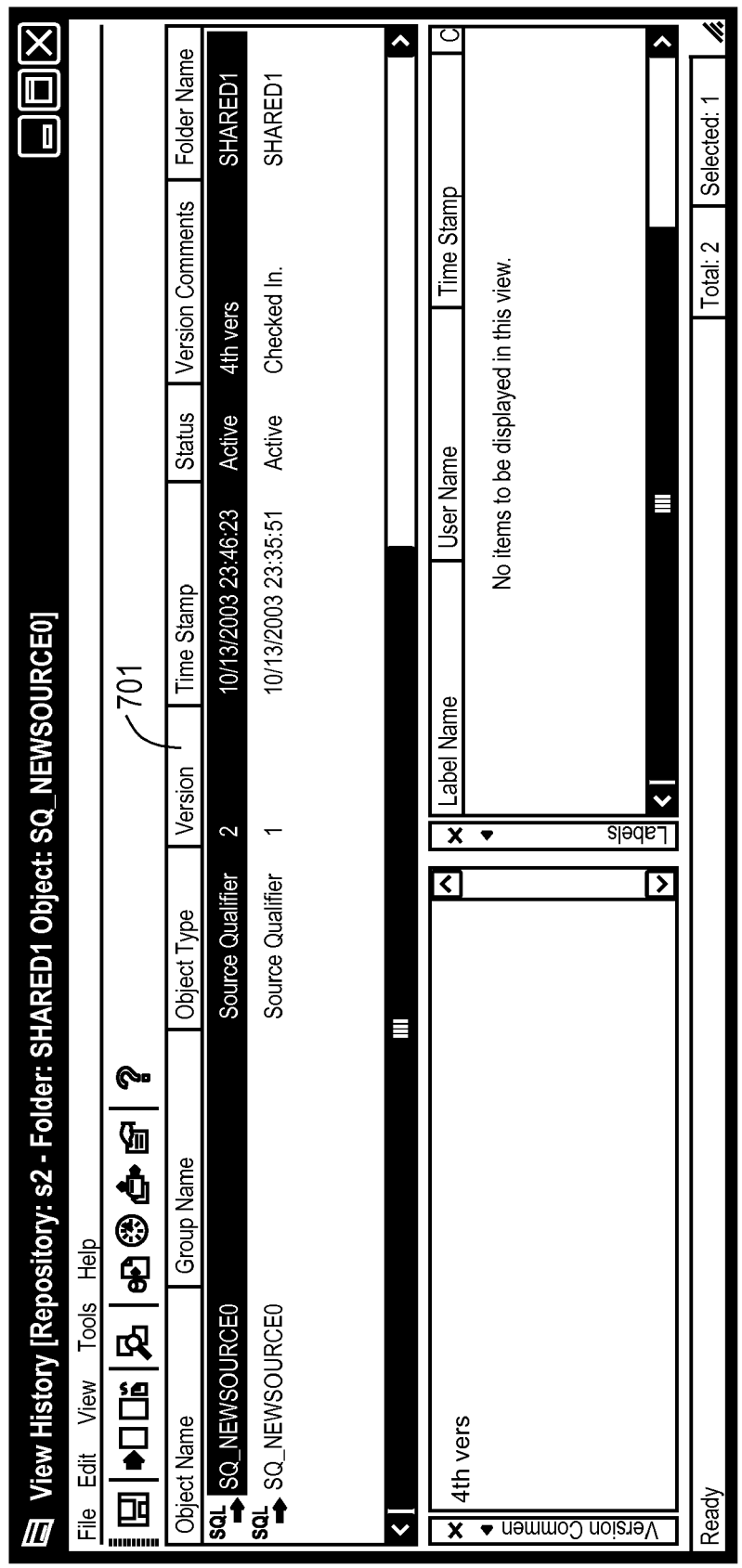
FIG. 7 is an illustration of the view of the History of a non-reusable Transformation after the creation of a version of the Mapping that modified the non-reusable Transformation.

Suppose a fourth version of the Mapping is created and the Source Qualifier Transformation in this fourth version of the Mapping is also modified. The view of the History for the Source Qualifier Transformation shows that there are now two versions (701) of the Source Qualifier Transformation (FIG. 7). Versions 1 through 3 of the Mapping will be using version 1 of the non-reusable Source Qualifier Transformation, and version 4 of the Mapping will be using version 2 of the Source Qualifier Transformation.

Therefore, according to one embodiment, references to a non-reusable object always contain the specific version number of the non-reusable object that is being referred to. In the example above, versions 1 through 3 of the Mapping will record in the repository that they are specifically using version 1 of the non-reusable Source Qualifier Transformation. Version 4 of the Mapping will record in the repository that it is specifically using version 2 of the non-reusable Source Qualifier Transformation.

In yet another embodiment, versioning may be applied to complex reusable objects that reference other reusable objects. For example, suppose the Source Definition and the Mapping are checked out. As described above, the Mapping is a complex reusable object that contains a reference to the reusable Source Definition.

Figure 8:
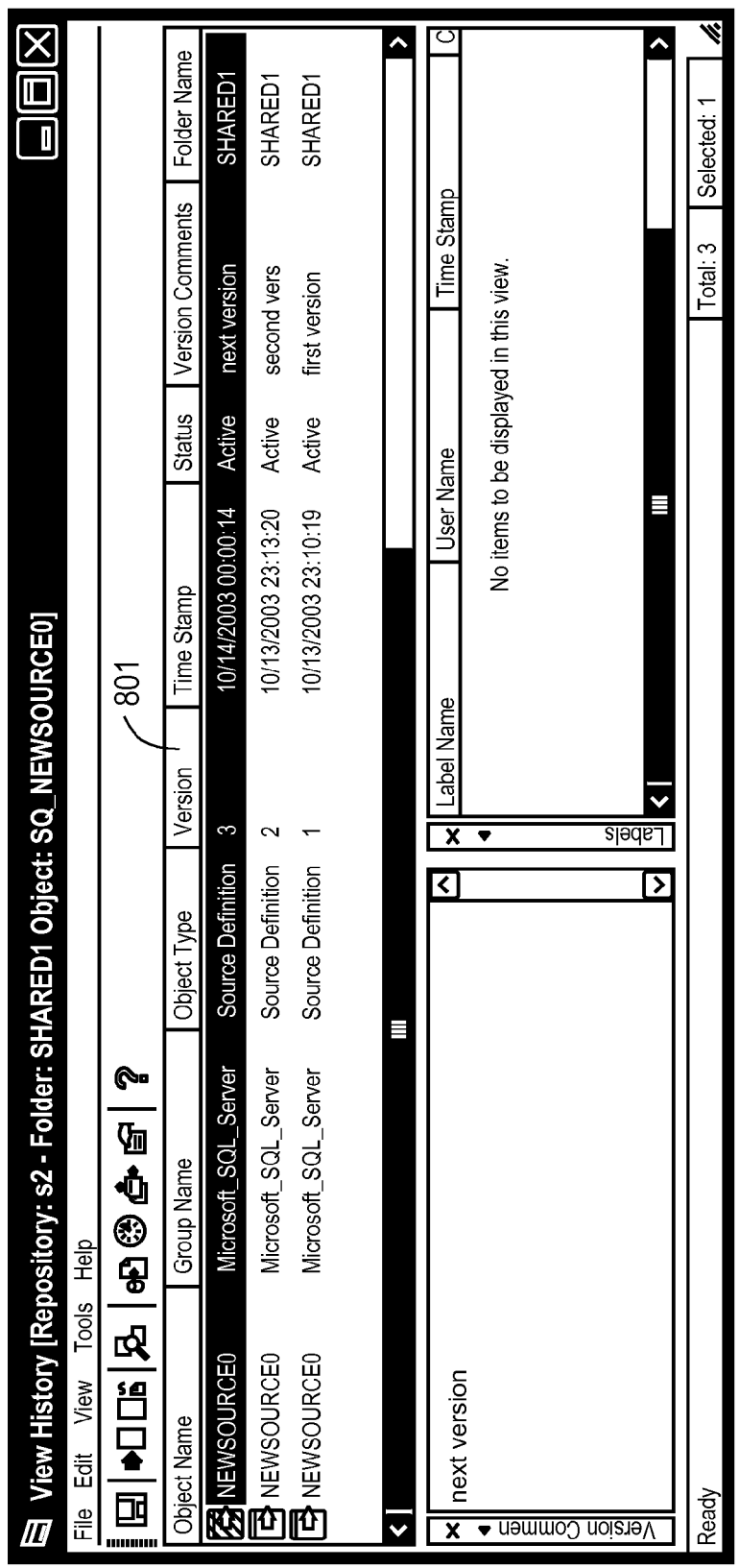

FIG. 8 depicts the View History for the Source Definition and FIG. 9 depicts the View History for the Mapping after the two objects are modified and checked in. By examining the order in which each version of the Source Definition and the Mapping were created, one can determine that version 5 of the Mapping will use (has a reference to) version 3 of the Source Definition, while versions 1 through 4 of the Mapping will use version 2 of the Source Definition. The recorded check out and check in times of each object allow the system to keep track of the relations between various versions of the complex objects that are referencing each other. That is, for example, when version 4 of the Mapping is checked out to create version 5 of the Mapping, version 4 is considered frozen. Whatever version of the Source Definition was being used by version 4 of the Mapping will be frozen as well as of the check out time of the Mapping, and no further changes to the Source Definition will be seen by version 4 of the Mapping.

In the above example, although not shown in the View History of FIGS. 8 and 9, the system recorded that version 4 of the Mapping was checked out at 11:55 pm, this created version 5 of the Mapping which was finally saved and checked in at 12:00 am. Because version 4 of the Mapping was checked out at 11:55 pm, its references to all other reusable objects was frozen as of 11:55 pm. If the Source Definition is modified after 11:55 pm, version 4 of the Mapping will ignore that change to the Source Definition. One can observe from the View History of the Source Definition (FIG. 8) that the last version of the Source Definition that existed as of 11:55 pm was version 2 of the Source Definition. Version 3 of the Source Definition was checked in at 12:00 am and that is after 11:55 pm, and therefore should be ignored. Thus, version 4 of the Mapping will use version 2 of the Source Definition.

In sum, versioning of simple or complex objects in a database may be carried out using the methods and systems of this invention. These methods and systems may be applied in connection with a relational database, an object database, or other suitable databases in various embodiments.

Updating Versioning Information for Cache Copies

In still another embodiment, the present invention also provides a method for automatically updating the versioning information for cache copies of an object that is used by a client application, whenever the object is checked in by another user or another application (and presumably modified hence a new version created). This capacity can be referred to as active metadata. It is particularly useful in interacting with database applications (client or user applications) that support object caching. That is, these applications store copies of the objects in their own memory, which presents a synchronization challenge for the enterprise database systems. If the user checks in an object from one client application, versions of that object that have been cached in memory in other client applications become stale. According to this embodiment, an object sends a notification to all other client applications using the active metadata capabilities. When a client application receives this notification, it updates its in-memory cache with the object's updated version number and other versioning-related information.

II. Querying

Queries are global objects that are persisted in the repository. Queries provide a mechanism to search versioned repository objects. This feature is available in three client tools: Designer which is used to create Mappings and all objects that might be used by Mappings such as Sources, Targets, and Transformations; Workflow Manager which is used to create objects pertaining to workflows, such as various tasks, schedulers, connections, and the like; and Repository Manager which enables users to manager all types of repository objects in a central place, such as check in, purge, deploy, and the like. Users in the Designer can query only designer objects, workflow manager objects in the Workflow Manager, and all supported objects in the Repository Manager. Similar to the custom tools menu in the client tools, to which users can add customized menu items in order to launch frequently used applications, users may add menu items to launch frequently used Queries from the client tools Designer, Repository Manager and Workflow Manager.

Query Permissions

Queries are secured objects, which means a user needs proper permissions to create, read, edit, or execute queries. In conjunction, public and private privileges also apply. Public queries are visible to all users while private queries are visible to the owner only. Users can change queries to public or private using the query browser on the clients. A list of available permissions and their meanings are specified here:

Execute permission: Users can select the particular permission in the query browser and execute it and view the query. Users with just execute permissions on the given query will not be able to view the query definition. This way, the user can use the query, but has no access to the business logic involved.

Read permission: With this permission, users can execute the query and also view the business logic of the query. However, they cannot modify the query and save it to the repository.

Write permission: This is the highest permission users can have on any secured object. This gives the user full control over the object. Users will be able to execute the query, view the business logic and update it.

Query Editor

Figure 10:
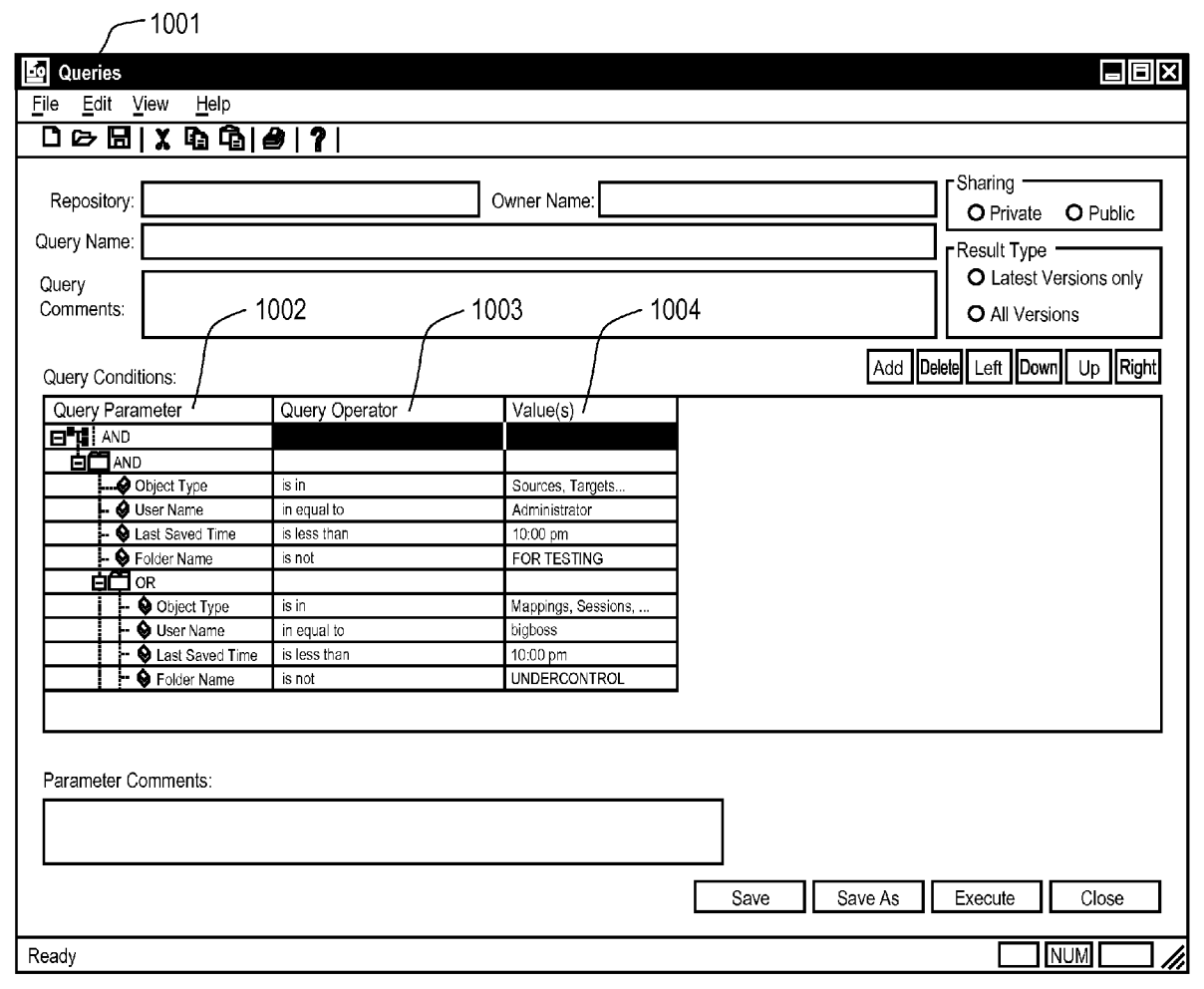

Queries contain a list of parameters that define the query, where each search condition specifies one rule for results. It is valid to have a query with a single condition. When the query contains multiple query conditions, these conditions will be joined together in a logical and or or condition. Referring to FIG. 10, from a GUI such as a query editor (1001), users define queries. Users can add or remove conditions in a query that has been opened in the query editor (1001). Conditions are joined automatically when the user inserts the second condition in the query. At this point, the query editor will insert an and condition in the root node. The existing query condition and the new one being created-will be inserted as child nodes under the root node. Each "and/or" node will have a minimum of two conditions directly under it.

Each query condition will have three main components, namely: query parameter (1002) that is being searched, query operator (1003) that defines the search, and values (1004) that are being searched for. The set of parameters (1002) to choose from is predefined and has been listed below. The list of operators (1003) available depends on the parameter (1002) specified by the user. Depending on the parameter (1002) and the operator (1003) chosen by the user, values (1004) can either be keyed-in by the user or can be chosen from a list of available choices. Number of inputs accepted for values (1004) will also depend on the parameter (1002) and operator (1003) chosen by the user. For example, if the user chooses Parameter "object type" and operator "equal to", only one input will be accepted. However with the same parameter, if the user chooses operator "is in" user can select multiple values from the list of object types. If the user chooses Parameter "object name" operator "equal to", one value will be accepted, for operator "is in" multiple values will be accepted. The difference between the first and second examples is that in the first example, the query editor (1001) will provide a set of values to choose from and in the second example, the user can type in values.

Each query contains one or more conditions, based on which the search is performed. The order of these conditions is important, both for display and execution purposes. The order in which the query is executed and displayed is the order in which the query conditions are listed in the query editor (1001).

Based on user-defined search conditions, the client constructs a Query object and sends it to the Repagent to execute. The Repagent provides repository service for repository clients. It sits in between the various clients and the actual repository database, thus hiding the heterogeneous nature of different types of databases from the clients. The Repagent accepts client requests, executes the requests on behalf the client, and finally sends the reply back to the client. From the Query object, the Repagent dynamically builds the necessary SQL queries, executes to populate result set, filters out incorrect entries, and returns the query results to the client. By default, query results return either the latest version or checkout version, but not both. However, when certain search conditions are present, such as object state, labels, deployment history, last saved time, and modifying user, then the search returns all versions of an object by default. Of course, these rules for default versions are voided when the object state search condition is present, in which case the user can specify a combination of version status and visible states, which allows the user to access particular versions of objects meeting the search criteria. The search criteria are listed in greater detail below:

Object type. find objects with selected object type(s). Search results include all supported object types by default when this condition is not present within a query.

Folders: find objects within selected folder(s). The displayed folder list contains only folders the current user has read permissions to, not the query's original creator or owner, but the current editing or executing user. Search results include all objects within all folders in the repository, which are readable by the current user by default when this condition is not defined within a query.

Labels: find object versions with applied Label(s). The displayed Label list contains all Labels in the repository. When searching for objects with Labels not equal to a certain value, the query results contain all objects that do not have the Label of the certain value as well as objects without any Labels applied.

Modifying users: find object versions that are modified by the selected user(s). The displayed user list contains all users in the repository, but not deleted users. If a version in the results was modified by a deleted user, the user name will be displayed as "unknown". In any case, results only examine checkouts belonging to the query's executing user, because checkouts of other users are not visible to the current user.

Deployment History: find objects that were deployed as part of a deployment group with the user-specified time. Objects that were part of a folder deployment or were not created from deployment are not included in the query results if this search condition is present.

LastSavedTime: find object versions that were saved within the user specified time.

Object State: find object versions with the selected object state(s). Displayed states include "Active" "Frozen, allow deploy to replace," "Frozen, not allow deploy to replace," "Invisible," "Visible," and "Checkout".

Is reusable: find objects that are/are not reusable. By default only returns reusable objects.

Object name: find objects with names matching user-specified string(s).

Object comments: find objects with object comments, no check-in comment, matching user-specified string(s).

Business name: find objects with business names matching user-specified strings.

Metadata extensions: find objects with metadata extension values with matching user inputs. Users can search by any or all of domain(s), metadata extension name(s), and metadata extension value(s).

Is referred: find objects that are use/unused by other repository objects. For example, if a source is used inside a Mapping, this source is considered referred.

Find X dependency for Y: find object dependency relationships. These dependencies can be direct or reverse. Direct dependency searches for all objects in the repository that use a given object. Reverse dependency is to find all the objects used by the given objects.

Query Results

Users can execute Queries from the query browser or from the query editor (1001). Executing a Query brings up the query results. The following information is available for each item in the result set: object type, object name, folder name, is checked out, is reusable, dependent objects, saved from (host name), object version number, last saved time/check in time, user that check-in this version of the object, check in comments, and all the Labels applied to the selected version of the object. Users can view the properties of this version of an object returned in the results, view properties of the object, view object change history, compare with previous version, apply a Label, export object using XL Object I/E, save results to a file, purge a version, or create or add to a Deployment Group. Although Query objects are persisted in the repository, query results are not.

The query results dialog supports multiple selections. This allows the user to apply Labels to multiple objects at once, add multiple objects to a Deployment Group, and the like.

III. Deployment

Incremental Deployment

Figure 11:
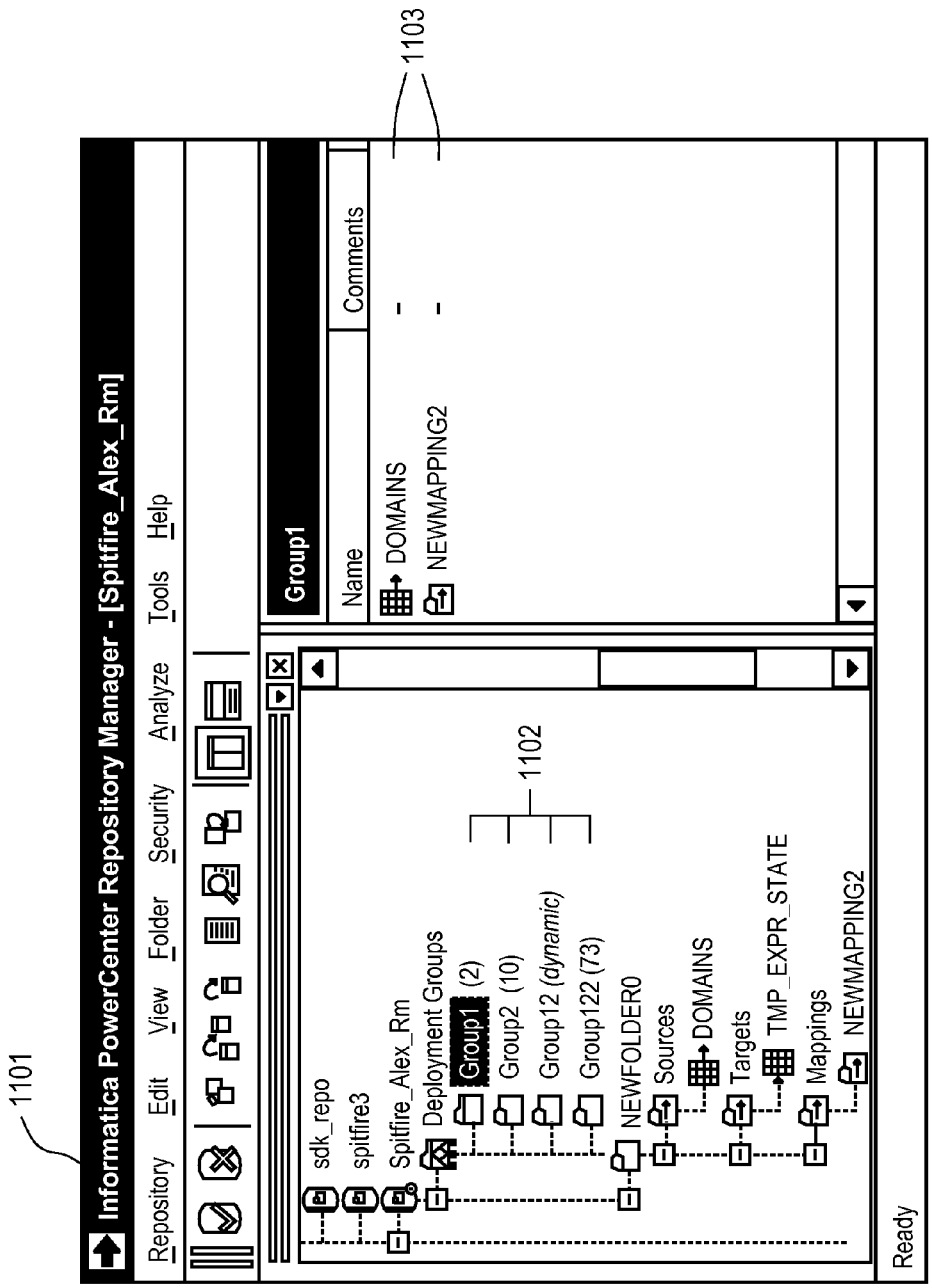
FIG. 11 is an illustration of a Repository Manager.

Referring to FIG. 11, the present invention provides a method and system for incremental deployment of database objects according to their versions. The Repository Manager (1101) displays Deployment Groups (1102). A Deployment Group (1102) is a repository object that contains references to other objects (like Source, Mapping, Workflow, etc.). The objects in Group 1 are displayed in the list (1103) on the right side of FIG. 11. The main goal of the Deployment Group is to help easily identify metadata for a bulk copy.

Figure 12:
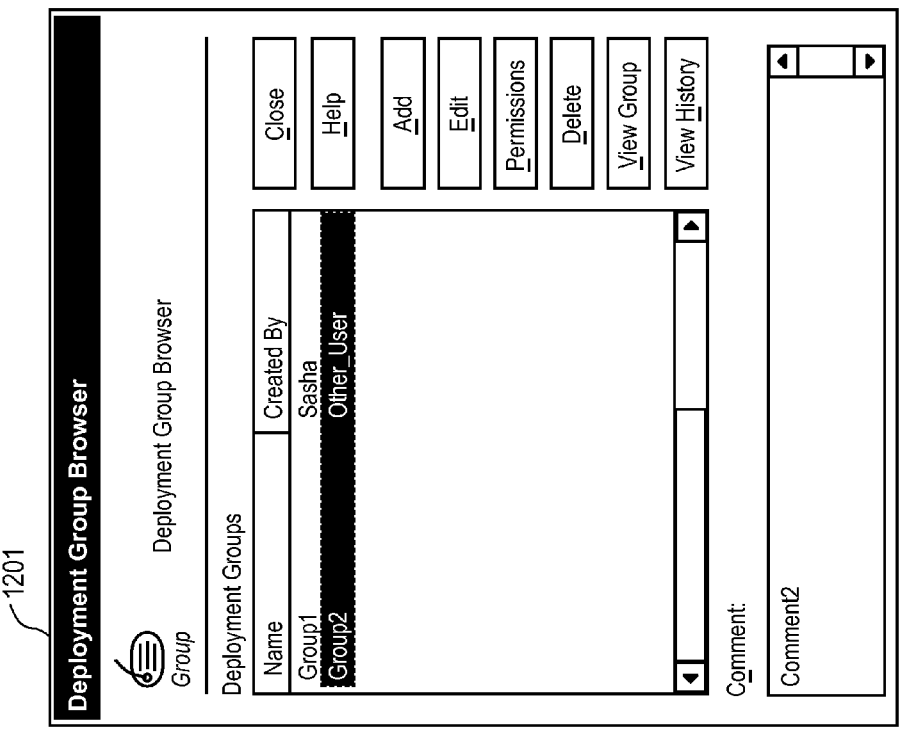
FIG. 12 is an illustration of a Deployment Group browser.

Referring to FIG. 12, a deployment group browser (1201) is provided with the following functionality: adding a new Deployment Group; editing and existing Deployment Group; deleting an existing Deployment Group; modifying the permissions associated with the Deployment Group; viewing the objects belonging to the Deployment Group; and view history which shows the history of this Deployment Group.

Figure 13:
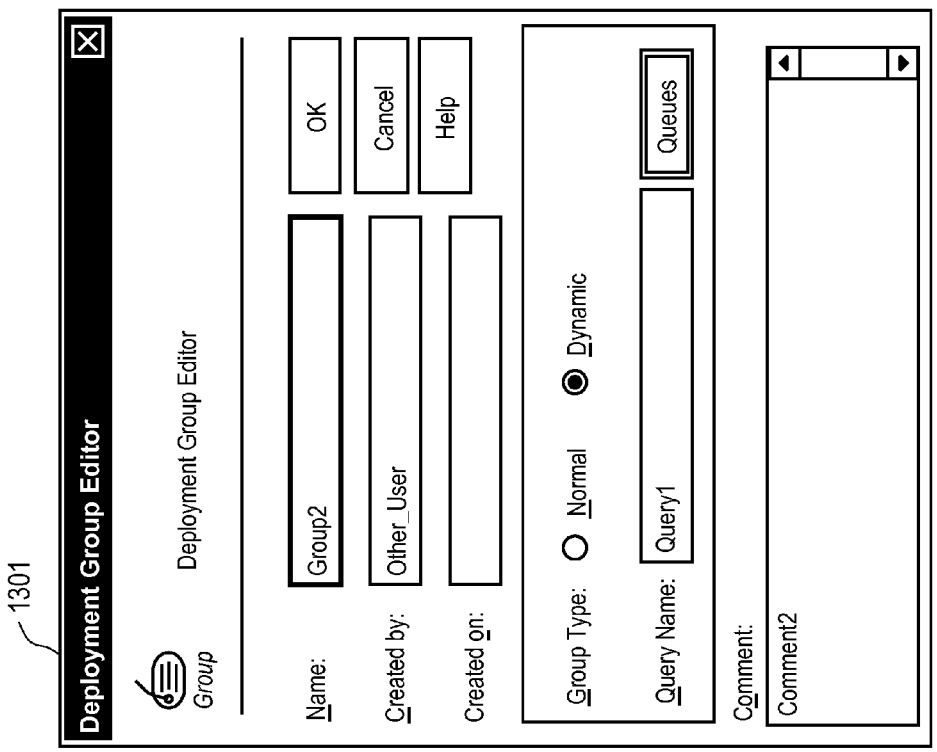
FIG. 13 is an illustration of a Deployment Group editor.

Referring to FIG. 13, the Deployment Group object has the following properties: deployment group name; deploy type (either normal or dynamic); query name (for dynamic type); user that created the Deployment Group object; creation date; and comments. A Deployment Group object with deploy type of normal means that the group is populated statically, whereas dynamic means that objects are selected for inclusion in the Deployment Group object by running a query which generates results that are automatically added to the Deployment Group object. All of these properties are displayed in a Deployment Group editor (1301). The Deployment Group editor (1301) permits the user to undertake the following actions: changing the name, changing the deployment type, selecting the Query (from Query browser) for dynamic type, and adding comments.

A deployment history can also be displayed. The deployment history dialog has the following columns: date/time; user; deploy group name; host; source repository; target repository; and comment. A user can get details of each of the deployments by double clicking on the appropriate item. The following detailed information will be presented: object name; object type (Workflow, Mapping, etc); folder name (source); version number (source); folder name (target); version number (target). For nested objects, the full path starting from the upper level is displayed. For example, if non-reusable object w1 was deployed from Mapping m1 the name will be "m1/w1."

With versioning, deployment is categorized into the following five cases of bulk copying:

Case A. Copy an entire folder from a source repository to a target repository, including all versions for all versioned objects.

Case B. Copy an entire folder from a source repository to a target repository, including only the latest version for all versioned objects.

Case C. Replace an entire folder, copy all versions of all versioned objects and truncate all existing objects in the target.

Case D. Replace an entire folder, copy only the latest version of all versioned objects and truncate all existing objects in the target.

Case E. Replace a deployment group, copying only specific versions of objects specified in the group.

Case A: From the end user's perspective, the newly created folder in the target repository should be an exact duplicate of the original folder including all shortcut references. Note that objects that were marked as deleted in the source folder will not be deployed, because end users would not be able to see these objects. Objects checked out in the source folder will not be deployed either, because not all users can see them. With these exceptions, all versions of all versioned objects are copied to the target repository.

Case B: Similar to case A, except only the latest version of versioned objects are copied. As the newest version is the only version visible to the end users, the user would perceive the two folders as identical, except when they view objects history, purge objects, or view version numbers. Thus, only the latest version information is available in the target repository. For example, when users view object history, they would see only one version, i.e., version 1.

Case C: Instead of simply truncating the folder to be replaced, the system checks the folder to determine if there is any object that has been checked out or has been locked to disallow deploy to replace. If so, then the deployment fails. As in Case B, the objects that were marked deleted or checked out in the source folder will not be deployed.

Case D: Similar to Case C, except only the latest version of the versioned objects are copied, so when users view object history for these objects, they would see only one version, i.e., version number 1.

Case E: There is a user interface as part of the Repository Manager (FIG. 11) to let users add versioned objects to Deployment Groups. Objects in a group can come from multiple source folders, and they can deployed to replace distinct parts of target folders. Therefore, the system checks that the objects to be replaced are not checked out in the target folders, not locked to disallow replacement, and do not have a name conflict with other objects in the target repository. If any of the conditions mentioned is not satisfied, then the deployment fails and an error message is generated.

Objects in deployment should not be checked out, however, if the status of an object in the deployment group is locked, the system may copy this object to the target repository as locked or unlocked depending on users' input.

If an object in the Deployment Group is marked deleted, the corresponding object in the target repository is marked deleted. On the other hand, if an object in the Deployment Group is not marked deleted, but its counterpart in the target repository is marked deleted, then the system undeletes this object in the target and then copies the object from source. For example, suppose Mapping myobj with version number n from folder srcfolder is in a Deployment Group, in order to be able to deploy this object, in the target folder targfolder:

1. Check there is no visible Mapping that has name myobj, otherwise, deployment fails and an error message on name conflicts is displayed.
2. If myobj was not deployed to targfolder before, its new version number is 1.
3. If myobj was deployed to targfolder before:
    Deployment will fail if the object was checked out, or if the object has been locked to disallow deploy to replace.
    If myobj is marked deleted in the group, deployment should mark delete the object in targfolder.
    If myobj is not marked deleted in the group, but is marked delete in targfolder, deployment should undelete myobj in targfolder then copy.
    Otherwise, if the current visible version number of myobj in targfolder is m, then its new version number is m+1, which becomes the new visible version number; version number m would not be visible anymore.

Dynamic Deployment

In another embodiment, methods and systems for dynamic deployment of objects are provided. Dynamic deployment combines incremental deployment and querying capacities. A dynamic Deployment Group can include a Query object which selects particular objects for inclusion in the group. For example, a query is executed and the resulting list of objects is subsequently selected to be included in a Deployment Group that is incrementally deployed. Prior identification (static identification) of the object to be deployed is no longer required because the list of objects is dynamically determined by running queries. To deploy a dynamic Deployment Group, the query will be executed first, and then the results will be saved in the Deployment Groups. Now the Deployment Group will be deployed just like a regular case E type. Before deployment, appropriate locks need to be acquired.

Queries may be created to define specific types of changes to objects that the user would like to deploy. For instance, a query can be defined to find objects that are labeled as both "ready to deploy" and "approved to deploy." A query can also be defined to identify all dependencies of the desired objects so that they too can be included in the deployment. A user may direct and monitor such deployment from a command line or via a graphical user interface.

The Deployment Group information is captured in two tables. The first table contains the information for Deployment Groups created. It includes the deployment group id, name, owner information, and creation time. The second table contains relationship between the objects and a Deployment Group. It stores the information that can tell which objects are grouped under one Deployment Group.

The group deployment histories are captured in two tables. The history includes information like the object name, source or target repository, source object version number, target object version number, source folder name, and target folder name. The Repository Manager is able to display this information through the global Deployment Group interface.

Deployment Steps Implementation. The following describes the major deployment steps:

1. Version Status Check. This step is done only for cases C and D (replace folders), when versioning is enabled. In this step, the system checks that there is no object checked out or locked for replacement in the target folder. If this is not satisfied, deployment fails. For case E, the same check is postponed in later steps for efficiency and convenience, specifically, the version information will be cached in the read ID maps, while the checking is done in step fetch sequence IDs (see steps 6 and 8 below).

2. Dependency Check. In this step, the system finds dependent objects on which the source objects to be deployed depend. These objects include: plug-ins, connections, servers, local subjects, and global subjects.

3. Get User Input. User input may be received via a graphical user interface in this step. For example, the system may prompt users to indicate whether they would like to deploy workflow run logs associated with the workflow objects deployed, or if any dependency folder needs to be overridden.

4. Get Total Row Count. The system caches information received by calculating total row counts. Thus, if a particular query returns zero rows, it need not be fetched for any subsequent operations on it.

5. Read Marked Deleted Objects. This step is done for case E only. In this step, the system determines if some object in a Deployment Group has been marked deleted before the table is fetched so the system knows which rows should not be inserted in the target. This is necessary because the system does not always copy the first class versioned object type first. For example, source fields is copied before sources, so while copying source fields the system has to know which sources are marked deleted in order to not copy their fields.

6. Read ID Maps. The next step is to read ID maps of dependent local and global folders. For copy folder (cases A and B), the referenced objects ID Mappings for replacement are the only ones needed. For replace folder or deployment group (cases C, D, and E), additional steps need to be performed. If no deployment history information exists for the folder pairs, the system runs compare folders to get the objects ID Mapping information. For case E, the version numbers of all first class versioned objects in target folders need to be cached.

7. Fetch Table. In this step, repository tables are fetched from source folders.

8. Fetch Sequence IDs. In this step, the sequence ID map is examined and sequence IDs are fetched from the target repository if needed. For case E, there are additional steps. First, no new IDs are allocated for objects marked deleted in the source. This is also when the system checks if any object to be replaced had been checkout out or locked for replacement in target. If any such object is found, the system produces an error message. A name conflicts check is also executed in this step.

9. Assign ID and Version Number. The system then assigns new IDs and version number for all the rows fetched. To be able to assign new version numbers, the system needs to determine which column in a table is for version number, as well as the "parent" id and type of this version number. For cases A and C, the same version number from the source repository is used for the corresponding version in the target repository. For cases B and D, a version number 1 is used for versioned objects in the target repository. For case E, the version number read from the target repository plus 1 is used as the new version number. If the IDs are not present in the ID maps read, those IDs would have version number 1.

10. Insert Table. Then the rows fetched from source are inserted to the target folders, the is_marked column is set to one for case E, and zero for all other cases. For case E, the source rows marked deleted and the source rows whose counterparts in the target is marked deleted are skipped. For cases A and C, the same check in history as recorded in the source repository is made. For cases B, D and E, one check in history entry for each first class versioned object copied is inserted, recording the fact that deployment copied the object from a given folder in a given repository. For case E only, for all objects in the group marked deleted, the objects they will replace in the target are marked deleted. A check in history is inserted for each such object, recording the fact that deployment marked deleted the object.

11. Invalidation. After all rows to the target repository have been inserted, Mappings and Sessions are invalidated if they are associated with invalid shortcuts or invalid connections.

12. Save Deployment History and Check In. For cases A, B, C and D, the system saves the folder deployment information and ID maps information. For case E, new entries to ID maps are inserted without modifying the existing entries. Then the deployment history is logged in both the source and target repository. Then the transactions are committed in both the source and target repository. After the commit, they system checks in all versioned objects for case E by updating all the marked rows.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of versioning objects in a database, the objects comprising a complex object including a reference to a version number of a non-reusable object, the non-reusable object being used by only the complex object, the method comprising:
    checking out the complex object, without automatically checking out the non-reusable object;
    receiving a modification to the complex object, where the non-reusable object is not modified;
    checking in the complex object;
    incrementing a version number of the complex object, while maintaining a reference to the version of the non-reusable object;
    receiving a query;
    responsive to the query not including an object state criterion, returning only current versions of all objects satisfying the query; and
    responsive to the query including an object state criterion, returning all versions of all objects satisfying the query.

2. The method of claim 1, further comprising:
    determining at least one application that uses at least one of the complex object or the non-reusable object; and
    sending a notification of the incremented version number of the used object to the at least one application to update a cached instance of the object.

3. A method of versioning objects in a database, the objects comprising a complex object including a reference to a version number of a non-reusable object, the non-reusable object being used by only the complex object, the method comprising:
    checking out the complex object, without automatically checking out the non-reusable object;
    receiving a modification to the complex object;
    responsive to an attempted modification of the non-reusable object, checking out the non-reusable object;
    checking in the complex object;
    checking in the non-reusable object;
    incrementing a version number of the complex object;
    incrementing the version number of the non-reusable object;
    updating the reference of the complex object to the incremented version number of the non-reusable object;
    receiving a query;
    responsive to the query not including an object state criterion returning only current versions of all objects satisfying the query; and
    responsive to the query including an object state criterion returning all versions of all objects satisfying the query.

4. The method of claim 3, further comprising:
    determining at least one application that uses at least one of the complex object or the non-reusable object; and
    sending a notification of the incremented version number of the used object to the at least one application to update a cached instance of the object.

5. A method of fetching a version of a second object, wherein a second object is referred to by a version of a first object and it is either reusable or non-reusable, each version of the second object includes a check in time and the version of the first object including a check out time and a version number of a version of the second object, the method comprising:
    responsive to the second object being non-reusable, fetching the version of the second object corresponding to the version number included in the first object, wherein the non-reusable second object is used by only the first object; and
    responsive to the second object being reusable:
        responsive to the version of the first object being the latest version of the first object, fetching a latest version of the second object;
        responsive to the version of the first object not being the latest version of the first object, fetching the version of the second object with the most recent check in time that is prior to the first object's check out time.

* * * * *